(12) United States Patent
Godard et al.

(10) Patent No.: US 11,226,821 B2
(45) Date of Patent: Jan. 18, 2022

(54) COMPUTER PROCESSOR EMPLOYING OPERAND DATA WITH ASSOCIATED META-DATA

(71) Applicant: Mill Computing, Inc., Palo Alto, CA (US)

(72) Inventors: Roger Rawson Godard, East Palo Alto, CA (US); Arthur David Kahlich, Sunnyvale, CA (US); David Arthur Yost, Los Altos, CA (US); Sebastien Paul Maurice Mirolo, San Francisco, CA (US)

(73) Assignee: Mill Computing, Inc., Palo Alto, CA (US)

( * ) Notice: Subject to any disclaimer, the term of this patent is extended or adjusted under 35 U.S.C. 154(b) by 108 days.

(21) Appl. No.: 16/566,040

(22) Filed: Sep. 10, 2019

(65) Prior Publication Data

US 2020/0065101 A1    Feb. 27, 2020

Related U.S. Application Data

(63) Continuation of application No. 14/567,820, filed on Dec. 11, 2014, now abandoned.
(Continued)

(51) Int. Cl.
*G06F 9/30* (2018.01)
*G06F 11/07* (2006.01)
(Continued)

(52) U.S. Cl.
CPC ........ *G06F 9/30145* (2013.01); *G06F 9/3001* (2013.01); *G06F 9/3016* (2013.01);
(Continued)

(58) Field of Classification Search
CPC .............. G06F 9/30043; G06F 9/30036; G06F 9/30192
See application file for complete search history.

(56) References Cited

U.S. PATENT DOCUMENTS

| 6,044,370 A | 3/2000 | Anfindsen |
| 6,854,048 B1 | 2/2005 | Dice |

(Continued)

FOREIGN PATENT DOCUMENTS

| WO | WO 2013/147865 A1 | 10/2013 |
| WO | WO2013/147896 A1 | 10/2013 |

OTHER PUBLICATIONS

Caches—From a mostly OS software perspective, 2005, University of New South Wales, 60 pages, [retrieved from the internet on Apr. 16, 2021], retrieved from URL <www.cse.unsw.edu.au/~cs9242/03/lectures/lect03.pdf> (Year: 2005).*
(Continued)

*Primary Examiner* — Jyoti Mehta
(74) *Attorney, Agent, or Firm* — Gordon & Jacobson, P.C.

(57) ABSTRACT

A computer processor is provided that employs a plurality of operand storage elements that store operand data values and associated meta-data as unitary operand data elements as well as at least one functional unit that performs operations that produce and access the unitary operand data elements stored in the plurality of operand storage elements. The meta-data associated with a given operand data value as part of a unitary operand data element can specify type of the unitary operand data element (e.g., vector or scalar), elemental width and floating-point error flags. The meta-data can also be used to define special operand data values (e.g., Not-a-Result and None). The meta-data is useful in optimizing execution, such as in speculation and vectorized SIMD operations. The computer processor can also support
(Continued)

a number of particular vector operations that are useful in optimizing execution of vectorized SIMD operations.

25 Claims, 23 Drawing Sheets

Related U.S. Application Data

(60) Provisional application No. 61/914,899, filed on Dec. 11, 2013.

(51) Int. Cl.
   *G06F 9/38* (2018.01)
   *G06F 12/14* (2006.01)

(52) U.S. Cl.
   CPC ...... *G06F 9/30029* (2013.01); *G06F 9/30032* (2013.01); *G06F 9/30036* (2013.01); *G06F 9/30043* (2013.01); *G06F 9/30072* (2013.01); *G06F 9/30094* (2013.01); *G06F 9/30163* (2013.01); *G06F 9/30192* (2013.01); *G06F 9/3859* (2013.01); *G06F 9/3865* (2013.01); *G06F 11/0721* (2013.01); *G06F 11/0772* (2013.01); *G06F 12/14* (2013.01)

(56) References Cited

U.S. PATENT DOCUMENTS

| | | | |
|---|---|---|---|
| 7,532,644 | B1 | 5/2009 | Masputra et al. |
| 8,762,444 | B2 | 6/2014 | Gentle et al. |
| 8,838,665 | B2 | 9/2014 | Pitkethly |
| 9,513,921 | B2 | 12/2016 | Godard et al. |
| 9,747,216 | B2 | 8/2017 | Godard et al. |
| 2003/0037221 | A1* | 2/2003 | Gschwind ........... G06F 9/30109 712/3 |
| 2004/0193837 | A1 | 9/2004 | Devaney et al. |
| 2005/0071610 | A1 | 3/2005 | DeWitt, Jr. et al. |
| 2005/0149521 | A1 | 7/2005 | Wang et al. |
| 2006/0200648 | A1 | 9/2006 | Falkenberg |
| 2007/0255928 | A1* | 11/2007 | Fukai ................. G06F 9/30105 711/220 |
| 2008/0034357 | A1 | 2/2008 | Gschwind |
| 2009/0187746 | A1 | 7/2009 | Symes et al. |
| 2010/0042808 | A1 | 2/2010 | Moyer |
| 2010/0042815 | A1 | 2/2010 | Gonion et al. |
| 2011/0047359 | A1 | 2/2011 | Eichenberger et al. |
| 2011/0078389 | A1 | 3/2011 | Patel et al. |
| 2011/0153993 | A1 | 6/2011 | Gopal et al. |
| 2012/0066510 | A1 | 3/2012 | Weinman |
| 2013/0080491 | A1 | 3/2013 | Pitkethly |
| 2015/0205609 | A1 | 7/2015 | Godard et al. |

OTHER PUBLICATIONS

Decoupled Access/Execute Computer Architectures, James E. Smith, 0149-7111/82/0000/0112$00.75, 1982 IEEE, 8 pages.

* cited by examiner

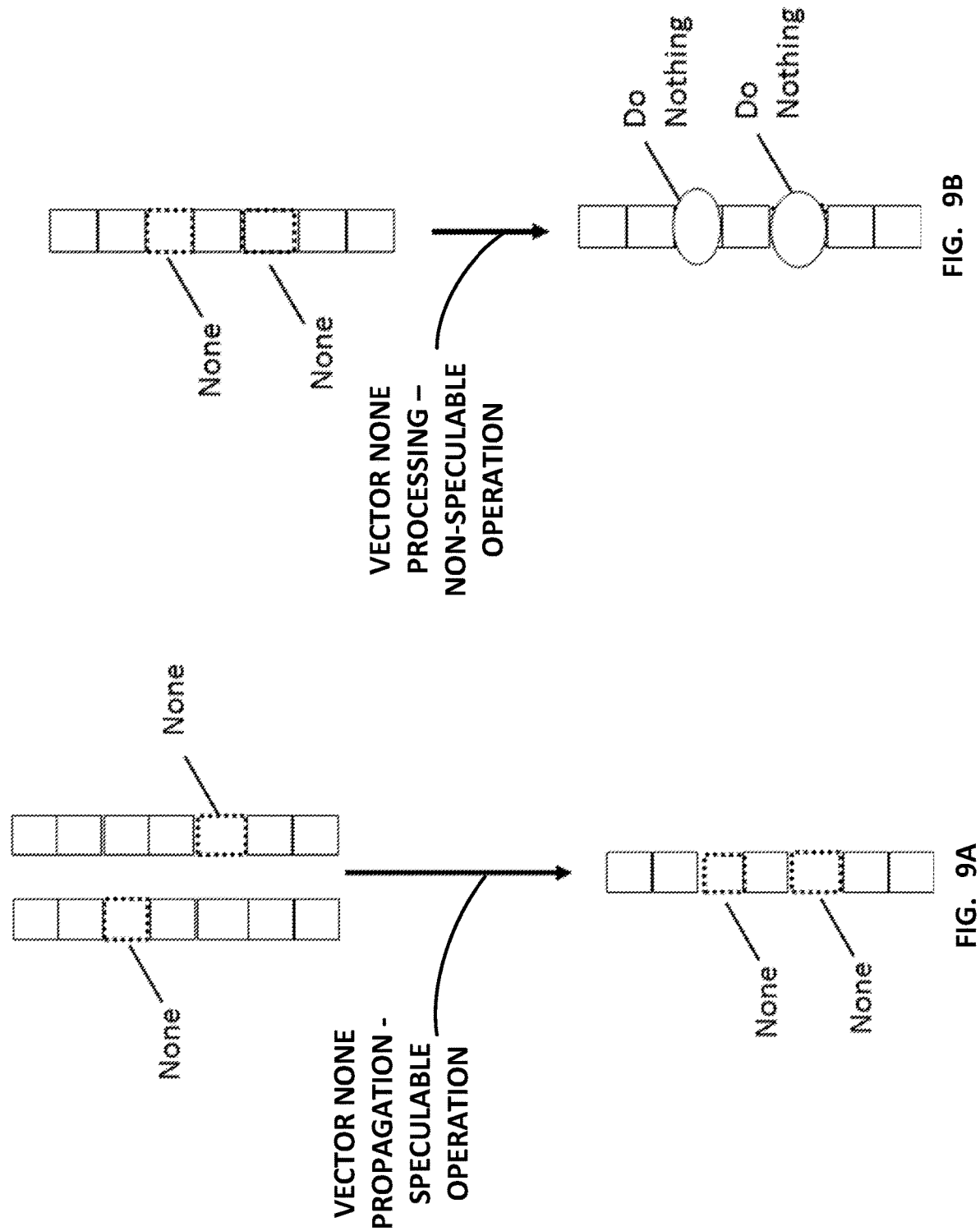

Scalar Pick Operation - *pick* scalar operand data element (control), scalar or vector operand data element (source "1"), scalar or vector operand data element (source "0"), and index to operand storage element(s) (or memory address) to store the result scalar or vector operand data element

COMPUTER PROCESSOR EMPLOYING OPERAND DATA WITH ASSOCIATED META-DATA

CROSS-REFERENCE TO RELATED APPLICATIONS

The present application is a continuation of U.S. Ser. No. 14/567,820, filed on Dec. 11, 2014, entitled "Computer Processor Employing Operand Data With Associated Meta-Data", which claims priority from U.S. Prov. Appl. Ser. No. 61/914,899, filed on Dec. 11, 2013, entitled "Metadata and Vectorization in CPUs," both of which are hereby incorporated herein by reference in their entireties.

BACKGROUND

1. Field

The present application relates to computer processors.

2. State of the Art

Modern computer processors employ micro-architectural techniques that seek to exploit instruction level parallelism (ILP), which is a measure of how many of the operations in a computer program can be performed simultaneously. Examples of such micro-architectural techniques include:

- instruction pipelining where the phases of execution of instructions can be partially overlapped;
- superscalar execution and VLIW in which multiple execution units are used to execute multiple instructions in parallel;
- out-of-order execution where instructions execute in any order that does not violate data dependencies; note that this technique is independent of both pipelining and superscalar execution; out-of-order execution can be implemented dynamically (i.e., while the program is executing) in order to exploit ILP; alternatively, out-of-order execution can be implemented at compile time and somehow convey this information to the hardware; and
- speculative execution which allow the execution of complete instructions or parts of instructions before being certain whether this execution should take place; a commonly used form of speculative execution is control flow speculation where instructions past a control flow instruction (e.g., a branch) are executed before the target of the control flow instruction is actually known; speculative execution is often used in combination with branch prediction, which is used to avoid stalling for control dependencies to be resolved.

These techniques are useful in exploiting ILP but have limitations. For example, the techniques that employ speculation can be inefficient when work is performed that is not actually needed and can require complex circuitry to enable discarding unneeded execution results. Furthermore, speculation is constrained to a limited set of operations or is carried out with an extreme overhead burden that wastes computational bandwidth and power.

These techniques also fall short in exploiting ILP that can be garnered from vectorization of while-loops and counting loops.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

Illustrative embodiments of the present disclosure are directed to a computer processor that includes a plurality of operand storage elements that store operand data values and associated meta-data as unitary operand data elements. The computer processor further includes at least one functional unit that performs operations that access the respective unitary operand data elements stored in the plurality of operand storage elements. The at least one functional unit can access the respective unitary operand data elements stored in the plurality of operand storage elements by hardware operations carried out by the computer processor that deal jointly with the operand data values and associated metadata together as unitary operand data elements.

In one embodiment, the meta-data associated with a given operand data value as part of a unitary operand data element can specify a type of the unitary operand data element. For example, the type of the unitary operand data element can be selected from the group consisting of i) a scalar operand type that represents a single scalar operand value and ii) a vector operand type that represents a number of scalar operand values. The single scalar operand value represented by the scalar operand type can have one of a number of predefined widths in bytes. The meta-data associated with the given operand data value as part of the unitary operand data element of scalar operand type can further specify one of the predefined widths in bytes. The number of scalar operand values represented by the vector operand type can each have one of a number of predefined widths in bytes. The meta-data associated with the given operand data value as part of the unitary operand data element of vector operand type can further specify one of the predefined widths in bytes.

In another embodiment, the operand data value of the unitary operand data element can be represented by at least one payload data element that is physically associated with the meta-data of the unitary operand data element. The meta-data can be generated and physically associated with the payload data element when loading the payload data element from a memory system operably coupled to the computer processor. The meta-data can be physically disassociated with the payload data element when storing the payload data element to such memory system.

The meta-data and the at least one payload element of the unitary operand data element can be configured to represent a Not-A-Result operand that is indicative of an error condition. The payload element of the unitary operand data element that represents the Not-A-Result operand can include debugging information (such as information that reflects the nature of the error condition and/or information that provides some indication of where in the executing program the error condition took place). The at least one functional unit can be configured such that, when processing a speculable operation that operates on a given Not-A-Result operand, the Not-A-Result operand propagates to the result of such speculable operation. The at least one functional unit can also be configured such that, when processing a non-speculable operation that operates on a given Not-A-Result operand, the at least one functional unit generates a fault that requires special handling by the computer processor.

The meta-data and at least one payload element of the unitary operand data element can be configured to represent a None operand that is indicative of a missing operand value. The payload element of the unitary operand data element that represents the None operand can include debugging information (such as information that provides some indication of where in the executing program the missing operand occurred). The at least one functional unit can be configured such that, when processing a speculable operation that operates on a given None operand, the None operand propagates to the result of such speculable operation. The at least one functional unit can also be configured such that, when processing a non-speculable operation that operates on a given None operand to update state information of the computer processor, the at least one functional unit skips the non-speculable operation and thus does not update the state information of the computer processor.

The meta-data associated with a given operand data value as part of a unitary operand data element of a scalar operand type that represents a floating-point number can be configured to specify a set of floating-point error condition flags. The at least one functional unit can be configured such that, when processing a floating-point operation on at least one input scalar operand that represents a floating-point number, the set of floating-point error condition flags for the at least one input scalar operand are logically combined together with the set of floating-point error condition flags that result from the floating-point operation by a Boolean OR operation in order to derive the set of floating point error condition flags for the result scalar operand. The at least one functional unit can also be configured such that, when processing a non-speculable operation on at least one scalar operand that represents a floating-point number, the set of floating-point error condition flags for the at least one scalar operand can be used to update a set of global floating point error registers maintained by the computer processor.

The computer processor can be part of a computer processing system that includes a memory system operably coupled to the computer processor. The memory system can be configured such that the operand data value of a respective unitary operand data element stored in the plurality of operand storage elements is loaded from the memory system, and the memory system does not include meta-data associated with the operand data value of the respective unitary operand data element.

In another aspect, a method for processing operand data in a computer processor is provided that determines whether an operation processed by the computer processor is a particular pick-type operation that specifies a control input operand that represents a Boolean value and two input operands. If so, the computer processor uses hardware circuitry of the computer processor to evaluate the Boolean value of the control input operand and select one of the two input operands as a result of the particular operation based on the evaluation of the Boolean value of the control input operand.

In one embodiment, the control input operand can be a scalar Boolean value, and the two input operands can both be a scalar operand or a vector operand.

In another embodiment, the control input operand can be a vector of Boolean values, and the two input operands can be a vector operand. In this case, the hardware circuitry of the computer processor is configured to evaluate each respective Boolean value of the control input vector and select one of the two corresponding elements of the two operands as an element of a result vector of the particular pick-type operation based on the evaluation of the respective Boolean value of the control input operand vector.

At least one of the two input operands can represent a None operand that is indicative of a missing operand value and selectable by the particular pick-type operation. The computer processor can be configured such that, when processing a non-speculable operation that operates on the None operand to update state information of the computer processor, the computer processor skips the non-speculable operation and thus does not update the state information of the computer processor.

In yet another aspect, a method for processing operand data in a computer processor is provided that determines whether an operation processed by the computer processor is a particular vector-smear-type operation that specifies an input vector argument of Boolean values. In this case, the hardware circuitry of the computer processor is used to evaluate the Boolean values of the input vector to produce a resultant vector of Boolean values with a pattern of zero or more leading false values that corresponds to the first true element in the input vector argument. The input vector argument can be a result of a SIMD relational operation applied to a data vector. The resultant vector of Boolean values is used as a guard mask to control the execution of SIMD operations as part of a while-loop. The guard mask can be used such that the SIMD operations are applied only to valid elements and not to overrun elements, or are applied only to overrun elements and not to valid elements. The last element of the resultant vector of Boolean values or an extra element produced by the particular vector-smear-type operation provides an indication whether the termination condition for the while loop has been detected.

In still another aspect, a method for processing operand data in a computer processor is provided that determines whether an operation processed by the computer processor is a particular remaining-type operation that specifies an input vector argument of Boolean values whose contents indicate which of a number of implied scalar iterations of a counting loop are valid and which are to be skipped. In this case, the hardware circuitry of the computer processor is configured to employ the input vector argument as a control input vector that is processed in conjunction with two data argument vectors. One of the data arguments is a vector of data corresponding to both the correct iterations and the iterations past the end of the count loop. The other data argument is a vector of None operands values for the iterations past the end of the counting loop. The control input vector is processed to select one of the two corresponding elements of the two data arguments as an element of a result vector of the particular operation based on the evaluation of the respective Boolean value of the control input vector. The result vector of the particular remaining-type operation can be used for vector iteration of the count loop and the semantics of None operand ensure that any iterations beyond the count loop have no visible program consequence. The particular remaining-type operation can further generate a scalar Boolean value that can be tested by a conditional branch operation to close the counting loop.

In yet another aspect, a method for processing operand data in a computer processor is provided that determines whether an operation processed by the computer processor is a particular satisfied-type operation that specifies an input vector argument of Boolean values for a number of iterations of a while loop search. In this case, each Boolean value of the input vector argument indicates whether the while loop search was satisfied in the corresponding iteration. The hardware circuitry of the computer processor is configured to produce first and second results based on the input vector argument. The first result represents a count of the leading unsatisfied iterations, and the second result represents a Boolean scalar that indicates whether any of the iterations satisfied the condition. The second result can be tested by a conditional branch operation to close the while loop search.

BRIEF DESCRIPTION OF THE DRAWINGS

FIG. 9A is an illustration of the processing of a vector None as part of a speculable operation.

FIG. 9B is an illustration of the processing of a vector None as part of a non-speculable operation.

DETAILED DESCRIPTION OF THE PREFERRED EMBODIMENTS

Figure 1:
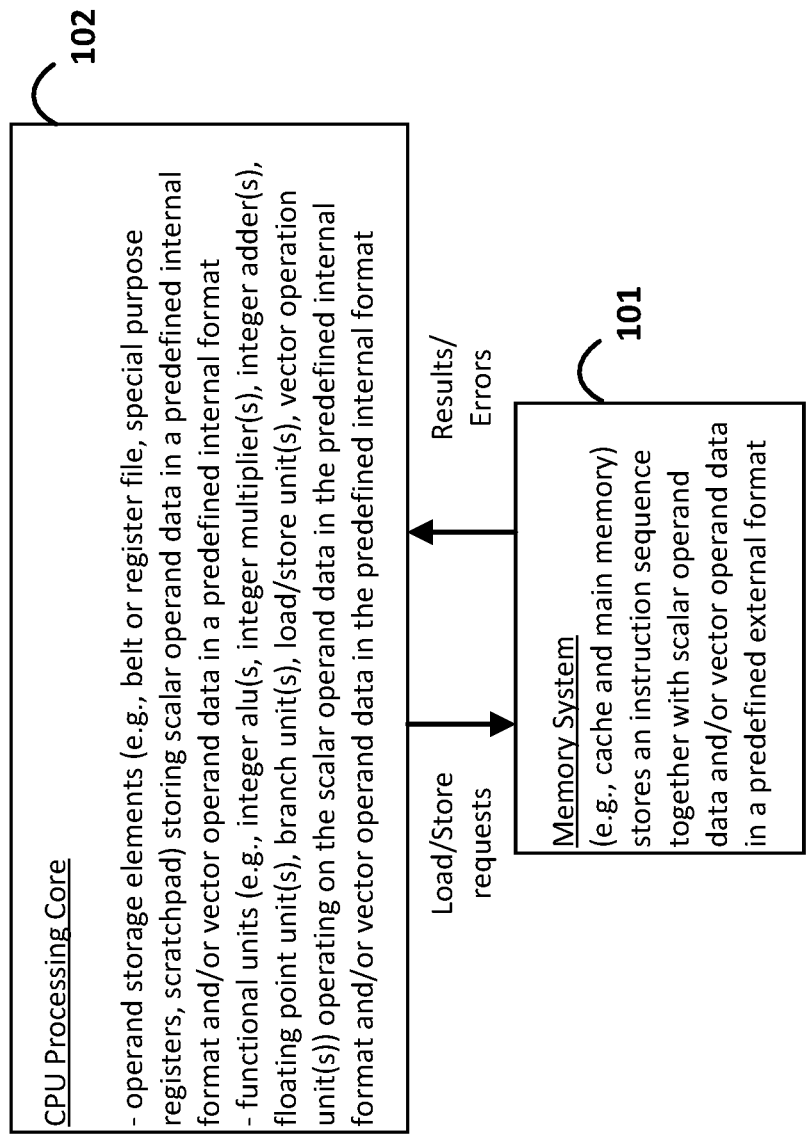
FIG. 1 is a high-level block diagram of a computer processing system according to an exemplary embodiment of the present disclosure.

According to the present disclosure, a sequence of instructions is stored in a Memory System 101 and processed by a CPU (or Core) 102 as shown in FIG. 1. The Memory System 101, which can include one or more levels of cache and main memory, is configured to store two types of data operands that are processed (consumed and/or produced) by the processing of the instructions by the CPU 102. The two types of data include scalar operands (or scalars) and vector operands (or vectors). Each scalar operand represents a single scalar value of some byte width. The scalar value can be many types with a number of byte widths per type. In one illustrative example, the scalar value can be an integer type (such as an integer of 1, 2, 4, 8 or 16 bytes in width), a pointer type (such as a pointer of 8 bytes in width), a floating-point number type (such as an IEEE binary float number of 2, 4, 6 or 16 bytes in width), a decimal number type (such as an IEEE decimal number of 4, 8 or 16 bytes in width), a fraction type (such as an ISO C fraction of 1, 2, 4, 8 or 16 bytes in width), or some other scalar type. Each vector operand represents an array of scalar values of a uniform type and width. The number of scalar values in a given vector operand can also be limited to power-of-two values. The size of the vector operands can also be of some uniform size (such as 16 bytes in width) or of a variety of predefined sizes if desired. The Memory System 101 stores each scalar operand and each vector operand as consecutive bytes of data in a predefined format (referred to herein as the predefined external format). The CPU 102 includes operand storage elements that store the two types of data operands (scalar operands and vector operands) in a predefined format (referred to herein as the predefined internal format) that is different from the predefined external format used by the Memory System 101. The operand storage elements can include storage elements organized as a logical belt (which is described in U.S. patent application Ser. No. 14/312,159 filed on Jun. 23, 2014, commonly assigned to assignee of the present application and herein incorporated by reference in its entirety), a register file, or special purpose registers. The operand storage elements can also include a scratchpad (which is described in U.S. patent application Ser. No. 14/311,988 filed on Jun. 23, 2014, commonly assigned to assignee of the present application and herein incorporated by reference in its entirety).

The CPU 102 also includes a number of functional units (such as one or more integer ALUs, one or more integer multipliers, one or more floating-point units, one or more branch units, one or more load/stare units, and one or more vector operation units) that operate on the scalar operands and/or the vector operands in the predefined internal format as stored by the operand storage elements. The functional units can be configured to process separate operations concurrently (in parallel with one another).

For example, the CPU 102 can possibly include one or more integer ALUs that perform twos-complement binary integer arithmetic for arithmetic and logical operations on scalar operands of supported widths. The representation of false and true, as produced by logical operations, can be binary zero and one respectively.

The CPU 102 can further employ one or more floating-point units that supports binary floating-point arithmetic utilizing IEEE-754R standard representation 2, 4, 8 and 16 byte widths. The two-byte width can be a valid computational representation as well as the storage representation defined by the standard. The floating-point unit(s) can further support decimal floating-point arithmetic utilizing IEEE-754R standard decade representation at 4, 8 and 16 byte widths. The floating-point unit(s) can further support complex arithmetic utilizing IEEE-754R standard complex representation using either binary or decimal underlying representation, in complex widths of 8 and 16 bytes in either radix and 4 bytes in binary. The functional units of the CPU 102 can be configured to provide conversion operations to and from the standard alternate decimal representation as well as conversion operations to and from binary floating-point representation.

The CPU 102 can further employ one or more integer adders and one or more integer multipliers that support fixed-point (integer) arithmetic uses C00X standard representation for both fixed-point and fraction types.

The functional units of the CPU 102 can perform addressing arithmetic utilizing pointers (addresses) that occupy 8 bytes. The pointers can be configured to address a global virtual address space of $2^{60}$ bytes, address a per-process local address space of $2^{60}$ bytes, and have support for garbage collected memory.

The functional units of the CPU 102 can support predicated operations that examine only the least significant bit of their predicate arguments. The functional units of the CPU 102 can be configured to have no preference for signed versus or unsigned data, and the signed-ness of the character type may be freely chosen by the programming language or software.

Scalar Operand Data Elements

Figure 2:
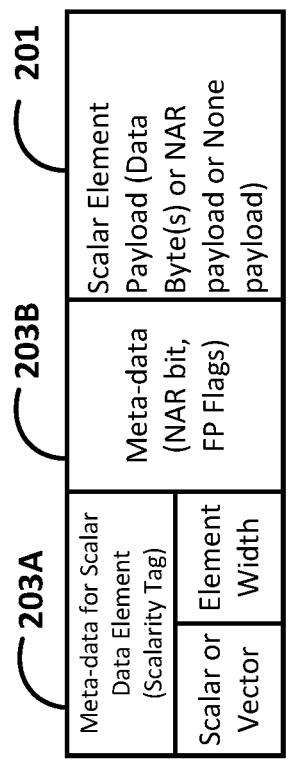
FIG. 2 is a schematic diagram of a scalar-type operand data element according to an exemplary embodiment of the present disclosure.

Each given scalar operand that is processed by the CPU 102 (either consumed as an argument of an operation or produced as a result of an operation), which is referred to as a "scalar operand data element" herein, includes payload data that is physically associated with meta-data according to the predefined internal format. An example of such a predefined internal format for the given scalar operand data element is shown in FIG. 2. The payload data of the scalar operand data element is shown as 201. The meta-data of the scalar operand data element is shown as 203A and 203B. For a valid scalar operand data element (which is not a NAR and None type as described below), the payload data 201 represents the value of a scalar operand having a predefined number of bytes (byte-width) that is a power of two. The meta-data 203A can include a tag (labeled as "scalarity tag") with two parts: i) a bit (labeled scalar or vector) whose binary value indicates that the associated payload data 201 represents a scalar operand (as opposed to a binary value that the associated payload data represents a vector operand), and ii) an element width field whose value represents the predefined number of bytes (power-of-two byte-width) of the associated payload data 201.

Figure 4B:
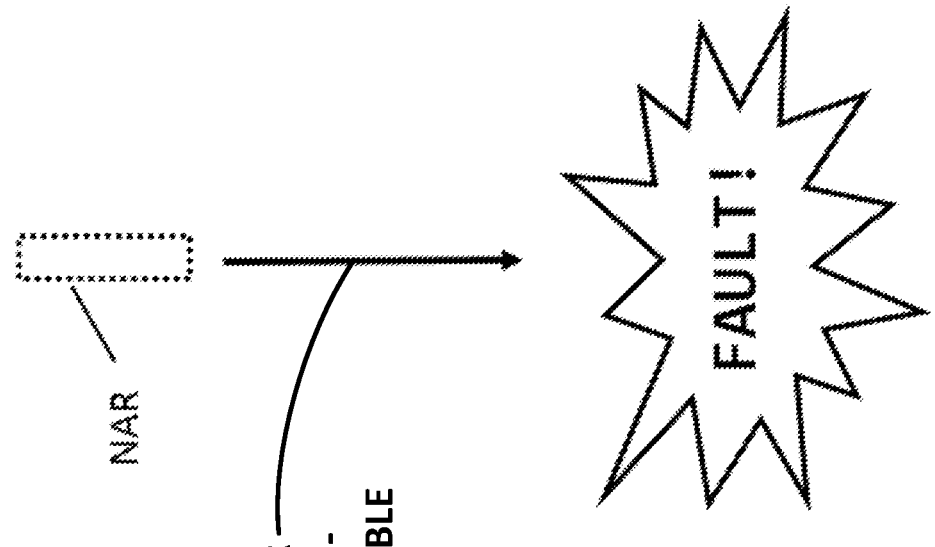
FIG. 4B is an illustration of the processing of a scalar NAR as part of a non-speculable operation.
Figure 4A:
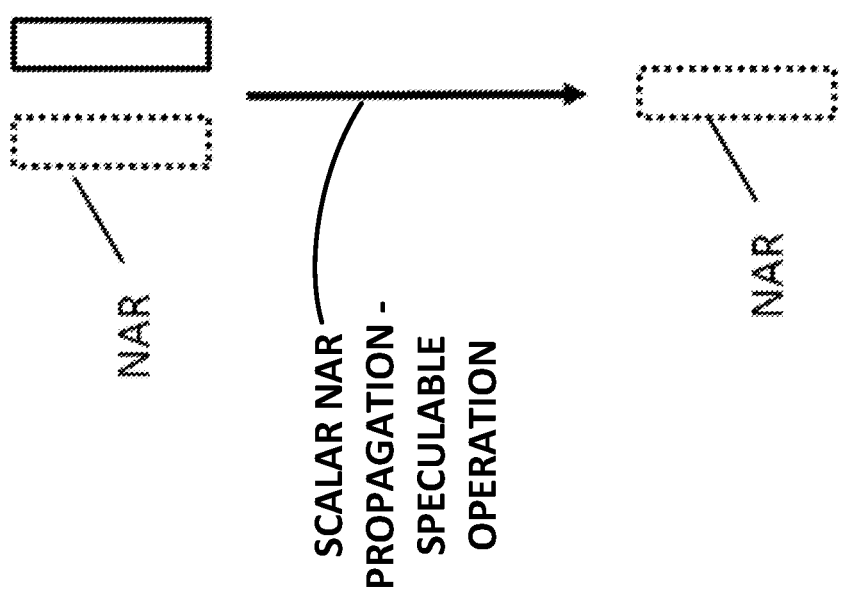
FIG. 4A is an illustration of the processing of a scalar NAR as part of a speculable operation.

The meta-data 203B of the scalar operand data element can further include a not-a-result (NAR) bit as shown in FIG. 2. The NAR bit indicates whether the associated payload data 201 is valid or reflects a previously detected error. If the NAR bit indicates that the payload data 201 is valid, the associated payload data 201 represents the value of a scalar operand having a predefined number of bytes (byte-width) that corresponds to the element width field of the meta-data tag 203A. The errors reflected by the NAR bit can include i) memory access violations, such as when a load operation addresses a memory location for which the program does not have access permission; ii) any one of many operations for which integer overflow is possible, when using the form of the operation which treats overflow as an error; and iii) a floating-point operation that generates a NaN signal (per the IEEE standard) when the CPU is set to treat the NaN signal as errors. If the NAR bit indicates that the payload data 201 reflects a previously detected error, the associated payload data 201 can provide useful debugging information. For example, such debugging information can include a KIND field that reflects the nature of the original error and a WHERE, field that provides some indication of where in the program the error took place as shown in FIG. 4. The WHERE field can possibly include the value of (or a hash of) the program counter value for the instruction that first created the error.

For each given scalar operand data element that represents a floating-point number, the meta-data of the given scalar operand data element can further include a set of Boolean exception flags (or FP flags) as shown in FIG. 2. The FP flags are implicit output arguments to all floating-point operations and correspond to error conditions that relate to the floating-point number of the scalar operand data element. For example, a set of five FP flags can represent the following error conditions that relate to the floating-point number of the scalar operand data element: a divide by zero error condition, ii) an inexact error condition, iii) an invalid error condition, iv) an underflow error condition, and v) an overflow error condition.

Scalar operand data elements that employ the NAR bit to indicate that the payload data 201 reflects a previously detected error are referred to as scalar NARs herein. Such scalar NARs are useful where the CPU 102 performs speculation. Speculation is an optimization technique employed by the CPU 102 where the CPU 102 can possibly perform some operations that may not be actually needed. The main idea is to do work before it is known whether that work will be needed at all, so as to prevent a delay that would have to be incurred by doing the work after it is known whether it is needed. If it turns out the work was not needed after all, any changes made by the work are reverted and the results are ignored. Speculation can involve going down one path in a code sequence and then if wrong discarding the results down this one path and executing the other path. Speculation can also involve going down all paths of execution in a code sequence and choosing the right result after the fact and then discarding the results down the wrong path(s). Speculation can also involve starting operations before it is known whether such operations will be needed at all. Speculation involves the speculative execution of speculable operations—an operation that can be speculatively executed without side effects to the logical program order (such as data hazards, structural hazards, and control or branching hazards). Speculation does not involve non-speculable operations—an operation that produces side effects to the logical program order (such as data hazards, structural hazards, and control or branching hazards) when speculatively executed. Furthermore, the detection of an error condition in the execution of a non-speculable operation produces a fault which requires special handling by the CPU 102 in a manner deemed appropriate by the system designer. Non-speculable operations can include control flow operations such as conditional branch operations that cannot handle a scalar NAR as the control predicate value. That is, if the branch is to be taken if a value is true and not taken if it is false, what should the branch do if the value is a NAR? Non-speculable operations can also include store operations where the address of the store operation is derived from a scalar NAR or where the value to be stored is a scalar NAR. In the case where the address of the store operation is derived from a scalar NAR, it is quite impossible to decide what location should be updated with the stored value. It is also contemplated that store operations can be speculable in nature. In this case, the speculation can buffer the corresponding store request (for example, by adding control bits to a write buffer) and not complete the buffered store request until the condition being speculated on is resolved. The operation that updates the speculation hardware (e.g., the control bits of the write buffer) upon resolving the condition being speculated on is non-speculable in nature. Note that when the CPU has speculatively executed operations that are not on the control path eventually taken, then the results of those mis-speculatively executed operations must be discarded.

Note that speculable operations can follow down a path through multiple branches, but the respective branch operations are not speculable. In this case, the operations down the path are lifted to in front of the branch operation and so are executed before we get to the branch operation. After the branch operation, the non-speculable operations of the chosen path (which were not, and cannot be, lifted to in front of the branch) will be executed and will use the speculated results of the chose path. The speculated results of the non-taken path are discarded.

In such a system, when a functional unit of the CPU 102 performs speculative execution of a speculable operation that involves one or more scalar operand data elements, the functional unit is adapted to check whether any input scalar operand data element that is supplied to the functional unit is a scalar NAR. If so, the functional unit is adapted to bypass the normal processing and produce a scalar NAR result, which is typically the same NAR value as the scalar NAR input. This operation is shown schematically in FIG. 4A. Consequently, the presence of a scalar NAR input during speculation indicates that an error condition occurred somewhere in the computation history leading to the input, and this error condition is passed down the speculated control path.

However, when a functional unit of the CPU 102 executes a non-speculable: operation that involves one or more scalar operand data elements, the functional unit is adapted to check whether any input scalar operand data element that is supplied to the functional unit is a scalar NAR. If so, the functional unit is adapted to bypass the normal processing and trigger the CPU 102 to raise a fault, which is specially handled by the CPU 102 in a manner deemed appropriate by the system designer. This operation is shown schematically in FIG. 4B.

Note that scalar NARs can be discarded like ordinary mis-speculated results, and the error condition does not have to be unwound. Furthermore, the use of the scalar NAR allows more kinds of operations to be speculable, and consequently greatly increases the chance that otherwise idle machine resources can be utilized by speculated computations which will often have actual utility.

Furthermore, the payload data 201 of the scalar NAR can provide useful debugging information (such as the KIND field and WHERE field as described above with respect to FIG. 3). Thus, in the event that the scalar NAR is processed by speculative execution of a non-speculable operation and triggers error handling as described above, the payload data 201 of the scalar NAR can be made available to programming tools such as a debugger to provide useful information to the programmer so that the error can be corrected at the point where it occurred.

Figure 5B:
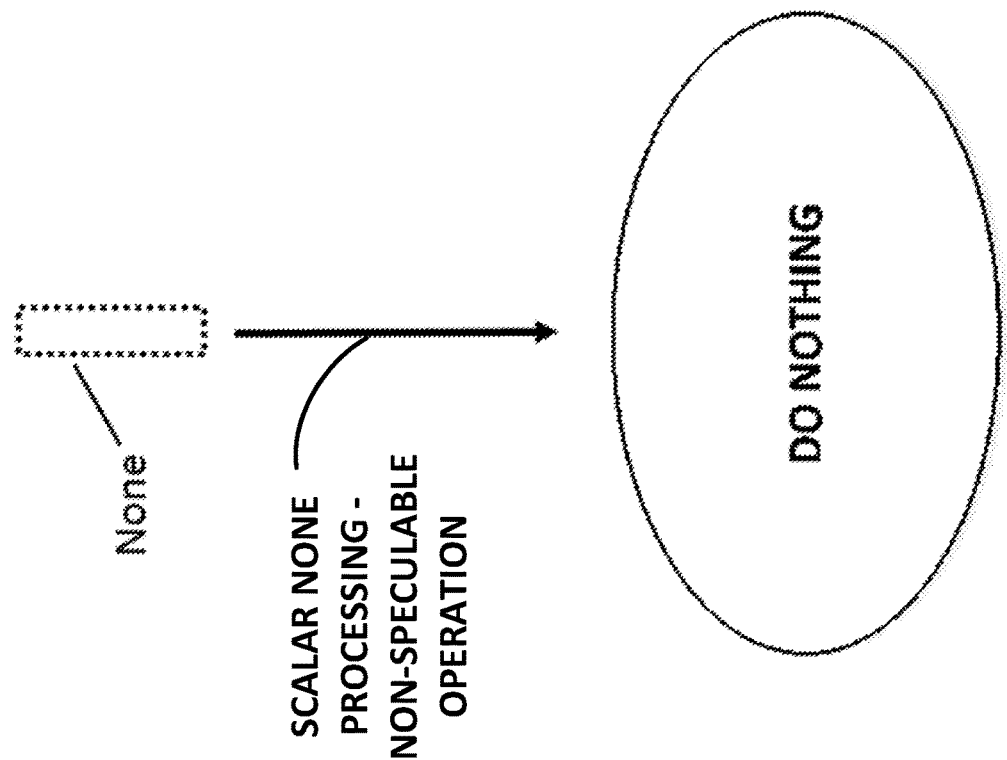
FIG. 5B is an illustration of the processing of a scalar None as part of a non-speculable operation.
Figure 5A:
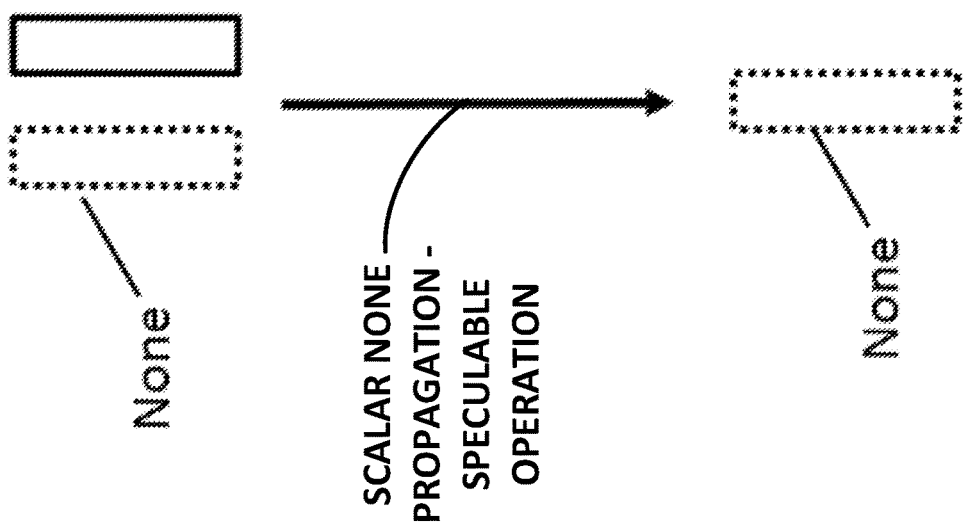
FIG. 5A is an illustration of the processing of a scalar None as part of a speculable operation.

The payload data 201 and the meta-data 203A and 203B of the scalar operand data element can also be used to define a unique data value (called a None) that can be distinguished from the ordinary results of computations. The None value is used to represent that data is missing and the operation on the missing data can be ignored. In one embodiment, the representation of the None can be similar to the NAR operand data element except for a difference in the KIND field of the payload element that distinguishes the None from the NAR operand data. None can be used during speculation. More specifically, when a functional unit of the CPU 102 performs speculative execution of a speculable operation that involves one or more scalar operand data elements, the functional unit is adapted to check whether any input scalar operand data element that is supplied to the functional unit is a None. If so, the functional unit is adapted to bypass the normal processing and produce a scalar None result, which is typically the same None value as the scalar None input. This operation is shown schematically in FIG. 5A. Consequently, the presence of a scalar None input during speculation is passed down the speculated control path.

However, when a functional unit of the CPU 102 executes a non-speculable operation that involves one or more scalar operand data elements and that updates the machine state (for example a store to memory or a write to a register), the functional unit is adapted to check whether any input scalar operand data element that is supplied to the functional unit is a None. If so, the functional unit is adapted to bypass the normal processing and simply skip the update operation. Note that any operation with a mix of scalar None and NAR arguments can be configured to behave as if only the scalar None is present.

Note that scalar None data element can be used without the support for the scalar NAR. For example, an implementation might choose a machine representation that combines a parity error (to distinguish it from ordinary data) and a particular bit pattern (to distinguish it from actual parity errors). The implementation must also provide means to make the scalar None value available to the program, for example in a dedicated register. Lastly, any machine operation that updates the machine state (for example a store to memory) must detect the presence of a scalar None and skip the update.

Figure 6A:
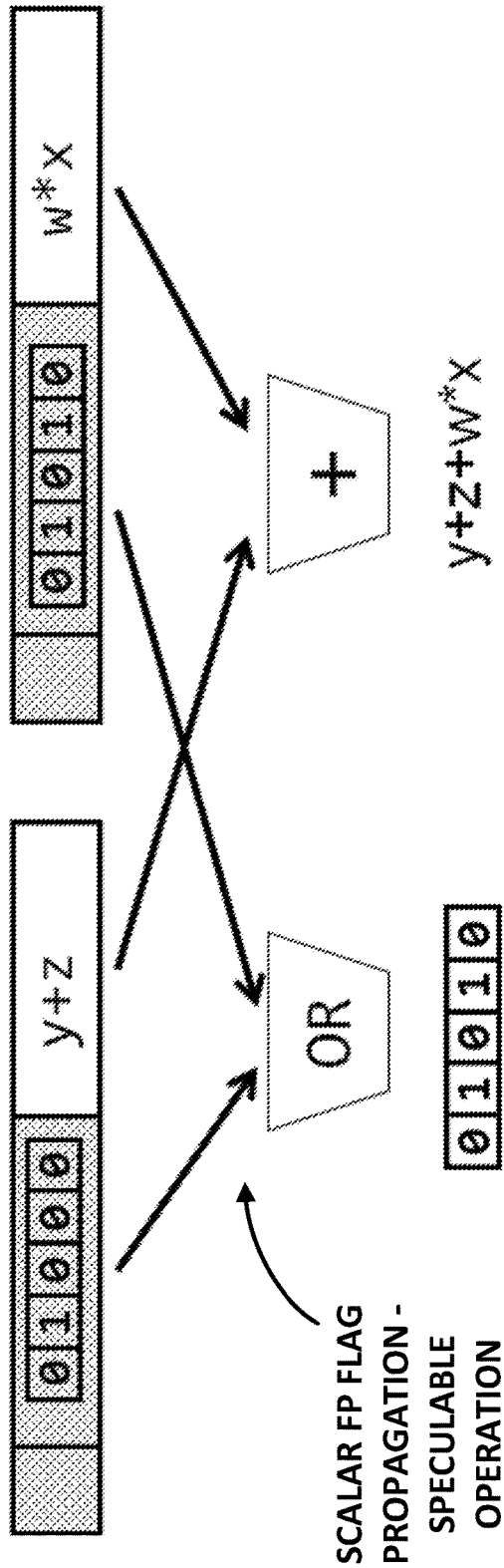
FIG. 6A is an illustration of the processing of a scalar meta-data floating-point (FP) flags as part of a speculable operation.
Figure 6B:
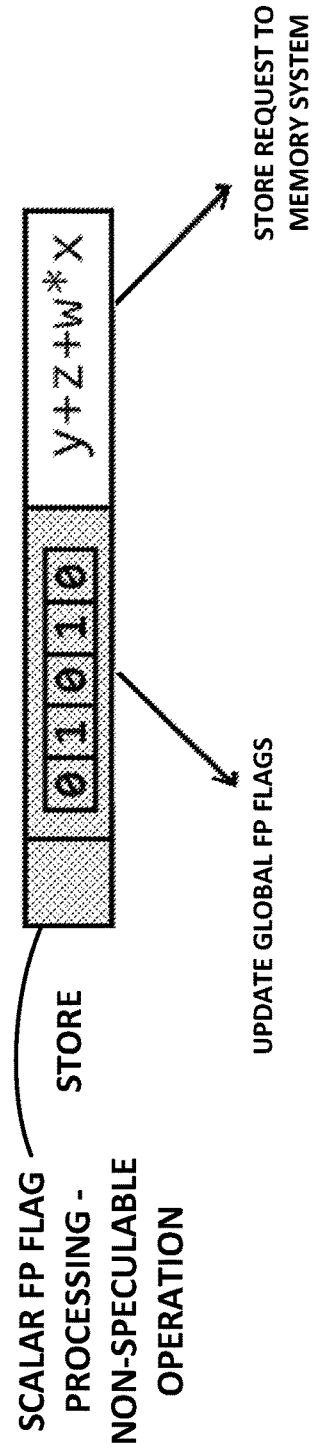
FIG. 6B is an illustration of the processing of a scalar meta-data FP flags as part of a non-speculable operation.

The scalar operand data elements that represent floating-point numbers and associated FP flags as part of the meta-data 203B are also useful for speculation. Specifically, when a functional unit of the CPU 102 performs speculative execution of a speculable operation that involves such a floating-point scalar operand data element (such as an intermediate or final floating-point computation), the functional unit is adapted to annotate the resultant floating-point scalar operand data element with a set of FP flags derived from the logical OR of the FP flags that are associated with the input argument floating-point scalar operand data element(s) as well as those FP flags resulting from any exceptions detected during the speculative execution of such speculable operation. This operation is shown schematically in FIG. 6A. Consequently, the FP flags associated with each given floating-point scalar operand data element reflects the exception history of the prior computation(s) that led to the given floating-point scalar operand data element. Such FP flag metadata is carried through all operations that can be speculated. However, when a functional unit of the CPU 102 performs a non-speculable operation that involves such a floating-point scalar operand data element and updates the machine state (for example a store to memory or a write to a register), the functional unit can be adapted to update a global set of FP flags for future use by the program. An example of this operation is shown schematically in FIG. 6B.

Vector Operand Data Elements

Figure 7:
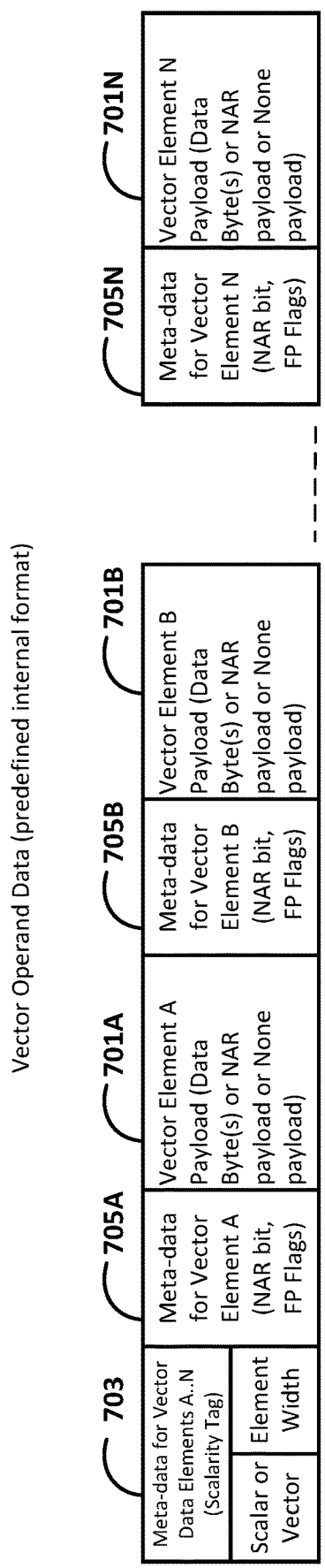
FIG. 7 is a schematic diagram of a vector-type operand data element according to an exemplary embodiment of the present disclosure.

Each given vector operand that is processed by the CPU 102 (either consumed as an argument of an operation or produced as a result of an operation), which is referred to as a "vector operand data element" herein, includes a number of scalar payload data elements that are physically associated with meta-data according to the predefined internal format. The representation and behavior of the scalar elements of the vector operand data element can be similar to that of a single scalar operand data element. An example of such a predefined internal format for the given vector operand data element is shown in FIG. 7. The payload data elements of the vector operand data element are shown as 701A, 701B, . . . 701N. The meta-data of the vector operand data element is shown as 703 and 705A, 705B, . . . 705N. For each valid scalar value that is part of the vector operand (which is not a NAR and None type as described above), the respective payload data elements 701A, 701B . . . each represents the value of a scalar operand having a predefined number of bytes (byte-width) that is a power of two. The total number of bytes of the number of scalar operands represented by the vector operand data element can be fixed by design. In one example, the total number of bytes of the number of scalar operands represented by the vector operand data element is fixed at 128 bytes. In this case, the predefined number of bytes of the scalar operands and the total number of bytes of such scalar operands of the vector operand data element dictates the number of scalar operands represented by the vector operand data element. The meta-data 703 of the vector operand data element can include a tag (labeled as "scalarity tag") with two parts: i) a bit whose binary value indicates that the associated payload data elements represents a vector operand (as opposed to a binary value that indicates that associated payload data represents a scalar operand), and ii) an element width field whose value represents the pre-defined number of bytes (power-of-two byte-width) of the associated payload data elements 701A, 701B . . . of the vector operand data.

The meta-data 705A, 705B . . . of the vector operand data element can further include a not-a-result (NAR) bit for each payload data element 701A, 701B . . . as shown in FIG. 7. The NAR bit indicates whether the associated payload data element is valid or reflects a previously detected error. If the NAR bit indicates that the corresponding payload data element reflects a previously detected error (e.g., it is a NAR as described above), the associated payload data element can provide useful debugging information. For example, such debugging information can include a KIND field that reflects the nature of the original error and a WHERE field that provides some indication of where in the program the error took place as described above with respect to FIG. 3. The WHERE field can possibly include the value of (or a hash of) the program counter value for the instruction that first created the error.

Figure 3:
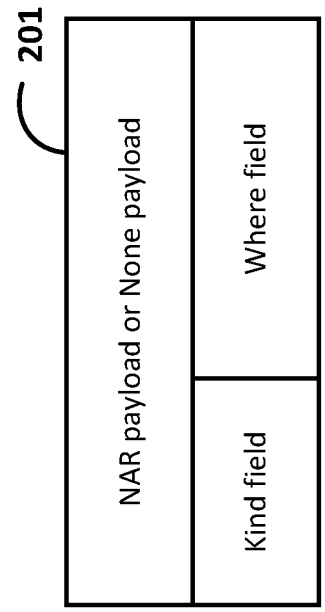
FIG. 3 is a schematic diagram of the payload of the scalar-type operand data element of FIG. 2 for a NAR or None operand value.

For each given vector payload data element that represents a floating-point number, the meta-data 705A, 705B . . . of the associated payload data element can further include a set of Boolean exception flags (or FP flags) as shown in FIG. 3. The FP flags are implicit output arguments to all floating-point operations and correspond to error conditions that relate to the floating-point number of the corresponding vector payload data element. For example, a set of five FP flags can represent the following error conditions that relate to the floating-point number of the corresponding vector payload data element: i) a divide by zero error condition, ii) an inexact error condition, iii) an invalid error condition, iv) an underflow error condition, and v) an overflow error condition.

The vector operand data elements that employ the NAR bit to indicate that the corresponding vector payload data element 701A, 701B . . . reflects a previously detected error are referred to as vector NARs herein. Such vector NARs are useful where the CPU 102 performs speculation as described above.

Figure 8B:
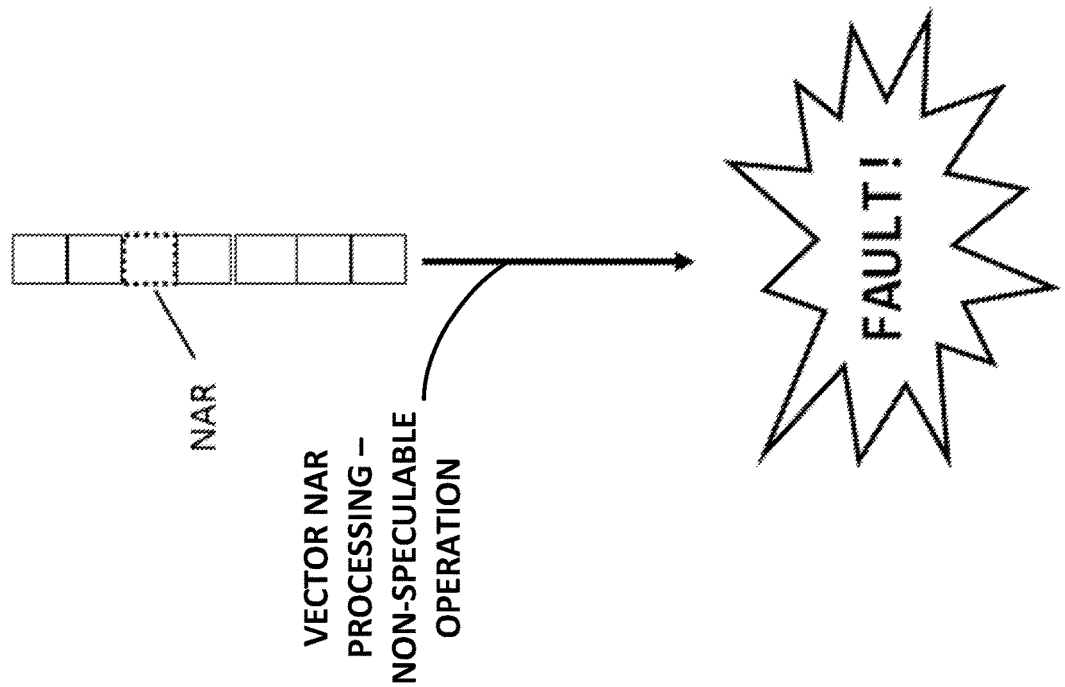
FIG. 8B is an illustration of the processing of a vector NAR as part of a non-speculable operation.
Figure 8A:
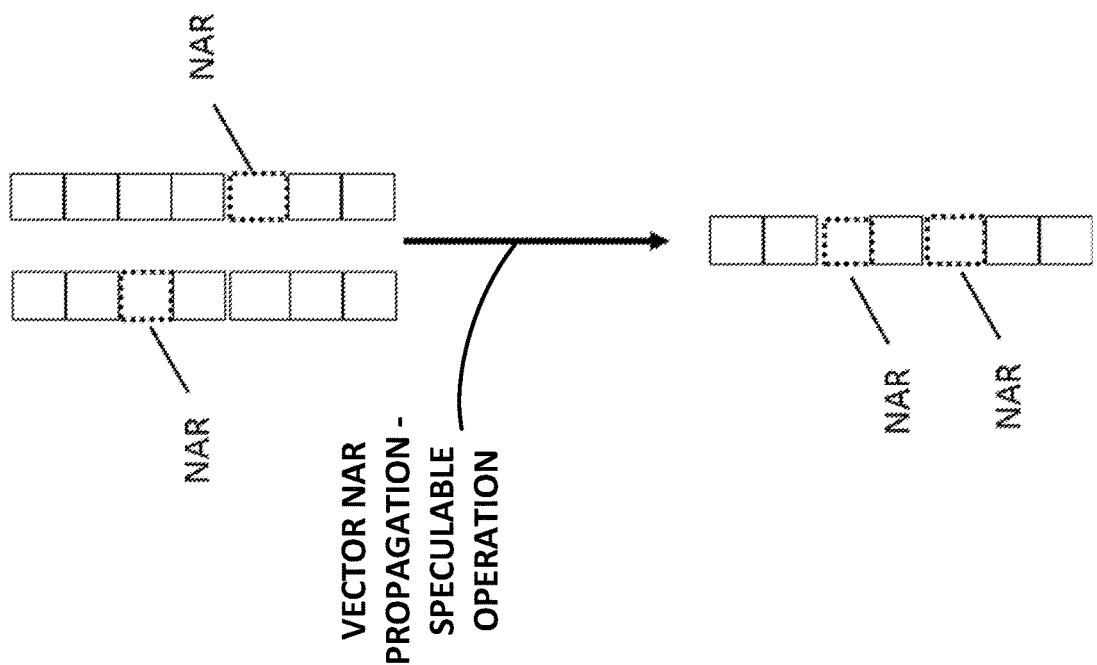
FIG. 8A is an illustration of the processing of a vector NAR as part of a speculable operation.

In such a system, when a functional unit of the CPU 102 performs speculative execution of a speculable operation that involves one or more vector operand data elements, the functional unit is adapted to check whether any input vector operand data element that is supplied to the functional unit is a vector NAR. If so, the functional unit is adapted to bypass the normal processing for each NAR payload element of the input vector operand data element(s) and produce a result vector operand data element with corresponding NAR payload elements. This operation is shown schematically in FIG. 8A where one NAR payload element for each one of the two input vector operand data element is propagated to the result vector operand data element. Note that the other vector operand data elements (other than the two pairs with a NAR payload element) are processed as normal (no bypass) to produce a corresponding payload element in the result vector operand data element. Consequently, the presence of a vector NAR input during speculation indicates that an error condition occurred somewhere in the computation history for the vector input, and this error condition is passed down the speculated control path.

However, when a functional unit of the CPU 102 executes a non-speculable operation that involves one or more vector operands data elements, the functional unit is adapted to check whether any input vector operand data element that is supplied to the functional unit is a vector NAR. If so, the functional unit is adapted to bypass the normal processing and trigger the CPU 102 to raise a fault, which is specially handled by the CPU 102 in a manner deemed appropriate by the system designer. Non-speculable operations on vector operands can include store operations where the address of the store operation is derived from a NAR or where the vector operand value to be stored includes a NAR. This operation is shown schematically in FIG. 8B.

Note that the one or more NAR payload elements that are part of a vector NAR can be discarded like ordinary mis-speculated results, and the error condition does not have to be unwound. Furthermore, the use of the vector NAR allows more kinds of operations to be speculable, and consequently greatly increases the chance that otherwise idle machine resources can be utilized by speculated computations which will often have actual utility.

Furthermore, the NAR payload element(s) that are part of the vector NAR can provide useful debugging information (such as the KIND field and WHERE field as described above with respect to FIG. 3). Thus, in the event that the vector NAR is processed by execution of a non-speculable operation and triggers error handling as described above, the NAR payload element(s) that are part of the vector NAR can be made available to programming tools such as a debugger to provide useful information to the programmer so that the error can be corrected at the point where it occurred.

The payload data elements 701A, 701B, . . . and the corresponding meta-data 705A, 705B . . . of the vector operand data element can also be used to define a unique data value (called a None) for one or more of such payload elements. Similar to the scalar None, the None value is used to represent that the payload data element of the vector operand data element is missing and the operation on the missing payload data element can be ignored. In one embodiment, the representation of the None payload data element of the vector operand can be similar to the NAR payload data element except for a difference in the KIND field of the payload data element that distinguishes the None from the NAR operand data. None payload data elements as part of a vector operand data element can be used during speculation.

More specifically, when a functional unit of the CPU 102 performs speculative execution of a speculable operation that involves at least one vector operand, the functional unit is adapted to check whether any input vector operand data element that is supplied to the functional unit includes one or more None payload data elements. If so, the functional unit is adapted to bypass the normal processing for each None payload element of the input vector operand data element(s) and produce a result vector operand data element with corresponding None payload elements. This operation is shown schematically in FIG. 9A where one None payload element for each one of the two input vector operand data element is propagated to the result vector operand data element. Note that the other vector operand data elements (other than the two pairs with a None payload element) are processed as normal (no bypass) to produce a corresponding payload element in the result vector operand data element. Consequently, the presence of one or more None payload data elements in the input vector operand data elements input are passed down the speculated control path.

However, when a functional unit of the CPU 102 executes a non-speculable operation that involves one or more vector data operand elements and that updates the machine state (for example a store to memory or a write to a register), the functional unit is adapted to check whether any input vector operand data element that is supplied to the functional unit includes one or more None payload data elements. If so, the functional unit is adapted to bypass the normal processing for each None payload element of the input vector operand data element(s) and simply skip the update operation for the operand data element. This operation is shown schematically in FIG. 9B. Note that any operation with a mix of vector None and vector NAR arguments can be configured to behave as if only the vector None is present.

Note that vector None payload elements can be used without the support for the vector NAR. For example, an implementation might choose a machine representation that combines a parity error (to distinguish it from ordinary data) and a particular bit pattern (to distinguish it from actual parity errors). The implementation must also provide means to make the vector None payload elements available to the program, for example in one or more dedicated registers. Lastly, any machine operation that updates the machine state (for example a store to memory) must detect the presence of the vector None payload elements and skip the update of the vector None payload elements.

The vector operand data elements that represent floating-point numbers and associated FP flags as part of the meta-data 705A, 705B . . . are also useful for speculation. Specifically, when a functional unit of the CPU 102 performs speculative execution of a speculable operation that involves such a floating-point vector operand data element (such as an intermediate or final floating-point computation), the functional unit is adapted to annotate the FP flags as part of the meta-data fields 705A, 705B . . . for the resultant floating-point vector operand data element with a set of FP flags derived from the logical OR of the FP flags that are associated with the input argument floating-point payload data element(s) as well as those FP flags resulting from any exceptions detected during the speculative execution of such speculable vector operation. This operation is similar to that shown and described above with respect to FIG. 6A, although it is performed over corresponding pairs of the meta-data fields for the two input vector operand data elements. Consequently, the FP flags associated with each given floating-point payload data element reflects the exception history of the prior computation(s) that led to the given floating-point payload data element. Such FP flag metadata is carried through all operations that can be speculated. However, when a functional unit of the CPU 102 performs a non-speculable operation that involves such a floating-point vector operand data element and updates the machine state (for example a store operation to memory or a write to an operand storage element), the functional unit can be adapted to update a global set of the FP flags for the payload data elements of the result vector operand for future use by the program. This is similar to that shown and described above with respect to FIG. 6B, although it is performed over the number of meta-data fields 705A, 705B . . . of the resultant vector operand data element in order to update a global set of the FP flags for the payload data elements of the result vector operand.

Figure 10:
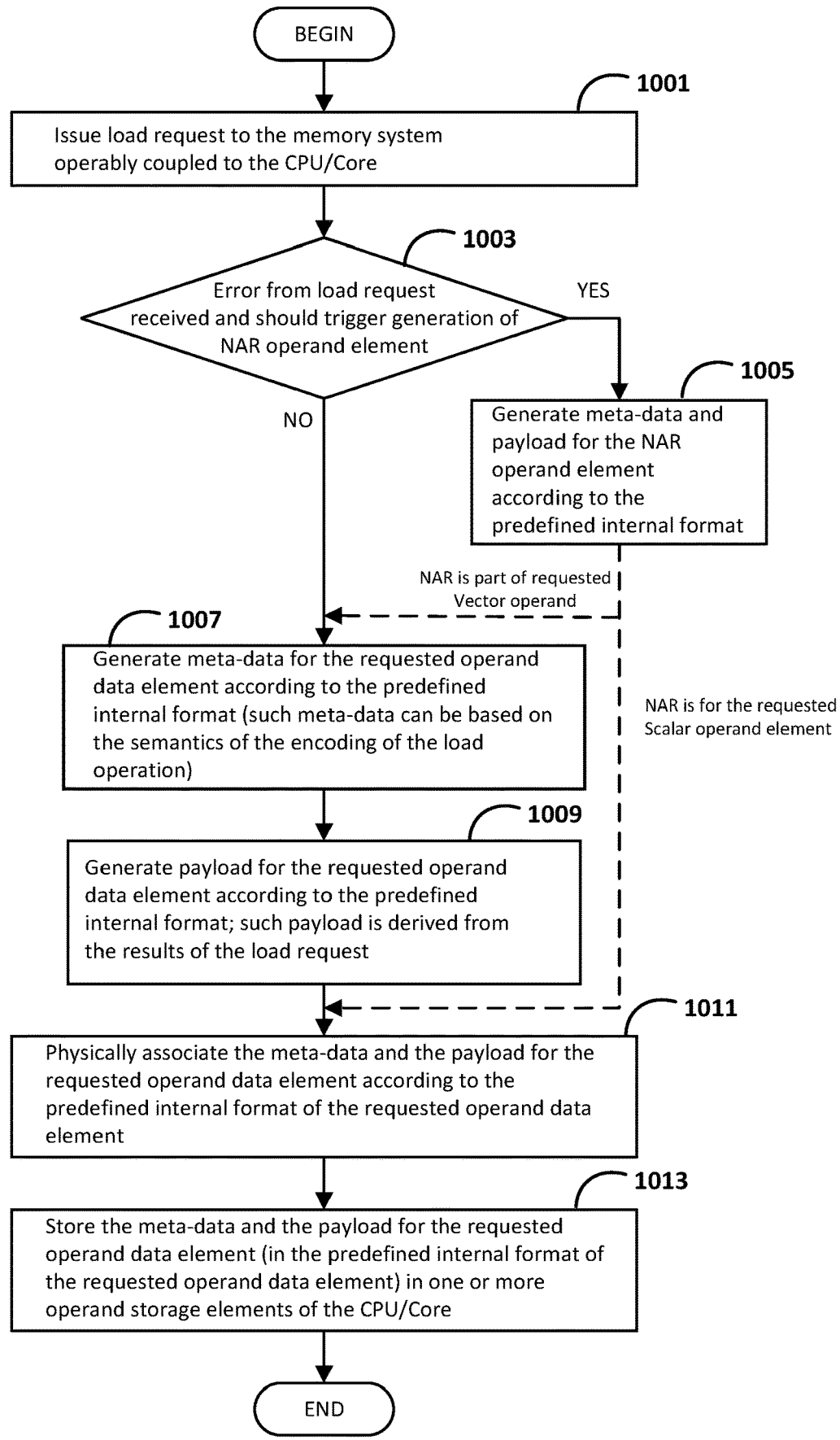
FIG. 10 is a flow chart showing illustrative operations of the CPU of FIG. 1 in loading operand data from the memory system in conjunction with the processing of a load operation.

FIG. 10 shows illustrative operations of the CPU 102 in loading operand data from the memory system 101 in conjunction with the processing of a load operation. The load operation specifies a memory address corresponding to one or more cache lines that stores requested operand data. The requested operand data can represent a scalar data value or a vector of data values.

In block 1001, the CPU 102 issues a load request to the Memory System 101 (such as to the top level Data Cache of the Memory System 101) for one or more cache lines that stores the requested operand data.

In block 1003, the CPU 102 checks whether the load request resulted in an error that has been received by the CPU 102 and is of the type that should trigger the generation of a NAR operand element. Such type can include the case where the load request addresses a memory location for which the program does not have access permission. If so, the operation continues to block 1005; otherwise the operation continues to block 1007.

In block 1005, the CPU 102 generates meta-data and the payload for the NAR operand element according to the predefined internal format. If the NAR operand element is an element of a requested vector operand, the processing continues to block 1007 for the other parts of the requested vector operand. If the NAR operand element represents the requested scalar operand, the processing continues to block 1011 as described herein.

In block 1007, the CPU 102 generates meta-data for the requested operand data according to the predefined internal format for the case where the requested operand data element (or an element of a requested vector data element) is not a NAR. Such meta-data can be based on the semantics of the encoding of the load operation corresponding to the load request. For example, semantically distinct loadbyte, loadshort, loadword and loaddouble operations can be used to specify the element width of a requested scalar operand. Such operations can be specified by different opcodes that distinguish such operations from one another and from other operations that belong to the instruction set architecture of the computer processor. In this case, the loadbyte operation corresponds to a scalar data operand of 1-byte, the loadshort operation corresponds to a scalar data operand of 2-bytes, the loadword operation corresponds to a scalar operand of 4-bytes, and the loaddouble operation corresponds to a scalar operation of 8-bytes. Similarly, semantically distinct loadSIMDbyte, loadSIMDshort and loadSIMDword operations can be used to specify the payload element width of a requested vector operand. In this case, the loadSIMDbyte operation corresponds to a payload data element of 1-byte, the loadSIMDshort operation corresponds to a payload data element of 2-bytes, and the loadSIMDword operation corresponds to a payload data element of 4-bytes. Alternatively, there can be a single generic load instruction that takes the intended tag as an argument.

In block 1009, the CPU 102 generates the payload for the requested operand data according to the predefined internal format for the case where the requested operand data (or an element of a requested vector data) is not a NAR. Such payload data can be derived (copied) from the results of the load request for the requested operand data.

In block 1011, the CPU 102 physically associates the meta-data and payload of the scalar operand data element according to the predefined format of the scalar operand data element (or physically associates the meta-data and payload data elements according to the predefined format for the vector operand data element).

In block 1013, the CPU 102 stores the meta-data and payload as part of the scalar operand data element constructed in block 1011 (or stores the meta-data and payload data elements of the vector operand data element constructed in block 1011) as a unitary logical data element in one or more operand storage elements that are sized to fit the operand storage element.

Figure 11:
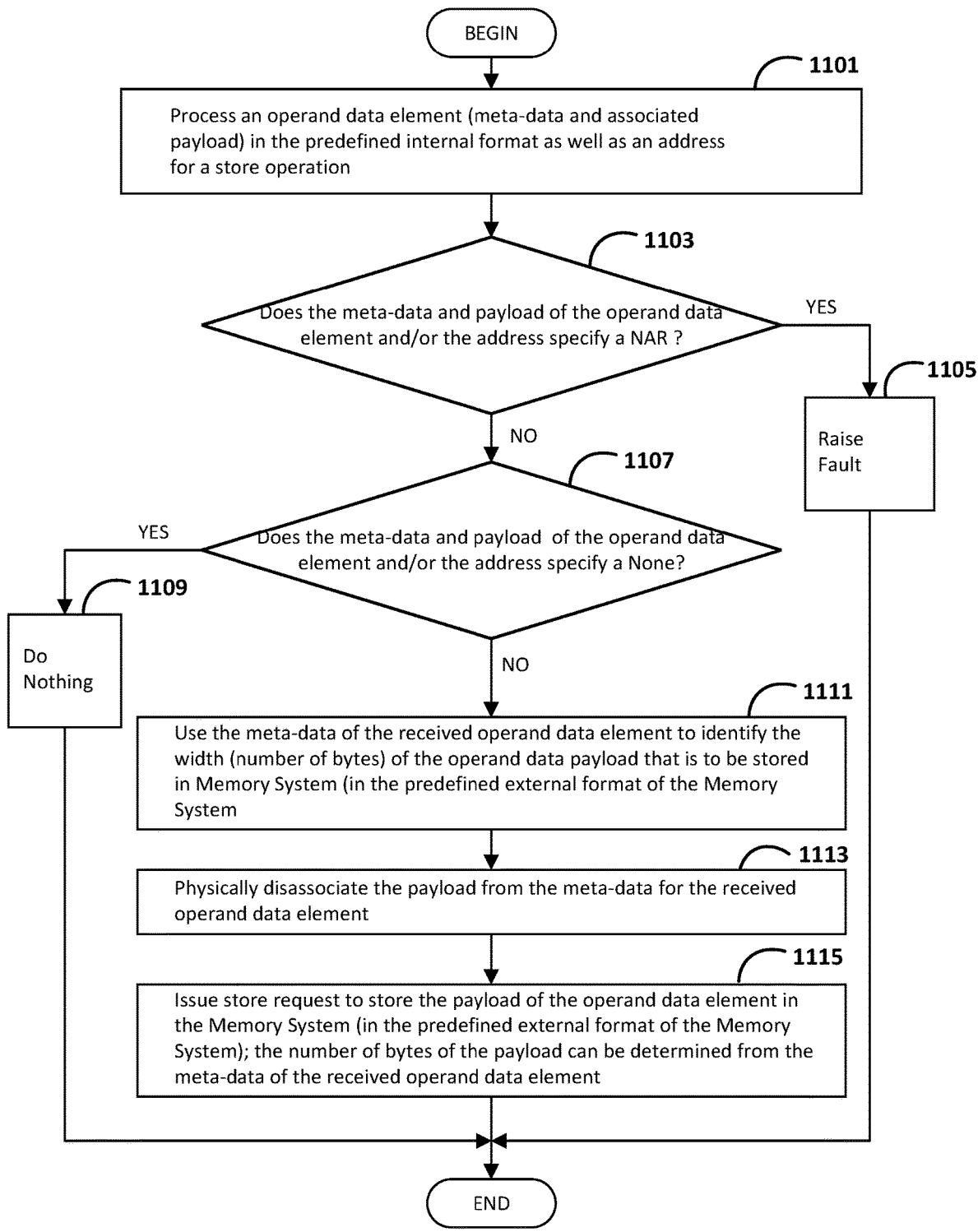
FIG. 11 is a flow chart showing illustrative operations of the CPU of FIG. 1 in storing operand data into the memory system in conjunction with the processing of a store operation.

FIG. 11 shows illustrative operations of the CPU 102 in storing operand data into the memory system 101 in conjunction with the processing of a store operation. The store operation specifies a memory address corresponding to one or more cache lines that will store the operand data. The operand data can represent a scalar data value or a vector of data values.

In block 1101, the CPU 102 processes an operand data element (a scalar or vector operand data element) in the internal format of the CPU 102 as well as the memory address corresponding to one or more cache lines that will store the payload of such operand data element. The operand data element processed by the CPU 102 can be read from an operand storage element of the CPU 102 or provided directly from a functional unit of the CPU 102.

In block 1103, the CPU 102 checks whether the meta-data and payload of the operand data element and/or the memory address that will store the payload of such operand data element specifies a NAR. If so, the operation continues to block 1105; otherwise the operation continues to block 1107.

In block 1105, the CPU 102 raises a fault such that it can be specially handled by the CPU as appropriate and the processing ends.

In block 1107, the CPU 102 checks whether the meta-data and payload of the operand data element and/or the memory address that will store the payload of such operand data element specifies a None. If so, the operation continues to block 1109; otherwise the operation continues to block 1111.

In block 1109, the CPU 102 does nothing and thus skips the store operation and the processing ends.

In block 1111, the CPU 102 uses the meta-data of the operand data element to identify the width (number of bytes) of the operand data payload that is to be stored in the Memory System.

In block 1113, the CPU 102 physically disassociates the meta-data and payload of the scalar operand data element according to the predefined format of the scalar operand data element (or physically disassociates the meta-data and payload data elements according to the predefined format for the vector operand data element).

In block 1115, the CPU 102 issues a store request to write the payload (or payload data elements) of the operand data element into the Memory System at the specified memory address. This can involve writing such data as one or more cache lines into the top level Data Cache of the Memory System 101.

Width Polymorphism

CPUs often deal with data of more than one size. Thus, a particular CPU may recognize native data in 1-, 2-, 4- and 8-byte widths or longer, and must perform analogous operations on each width. Usually mixed width operations are not supported, but the instruction set admits the same set of operations on data all of the same size, and instructions are provided to transform data from one size to another. Thus, a CPU may have a different add operation corresponding to different byte widths, such as an addbyte operation for the single byte wide, an addshort operation for 2-byte width, an addword operation for the 4-byte width, and an addlong operation for the 8-byte width. The CPU may also have operations to convert a byte to a short (2-bytes), short to a word (4-bytes) and a word to a long (8-bytes), and vice-versa.

The number of permutations of these width-sensitive operations can increase rapidly with increase in the number of distinct supported widths, which complicates the instruction set and the software and hardware that must deal with it. Some machines reduce the clutter by providing conversions only to and from some canonical length, or do not provide sized variants for operations like add, forcing the program to perform explicit conversions or multi-instruction sequences. While this approach does reduce instruction set clutter, it makes programs bigger and slower.

Many modern machines also support single-instruction-multiple-data instructions (SIMD) which operate in parallel on groups of data all of the same size. Thus, a single instruction might perform eight byte-width add operations in parallel, whereas another might perform four short-width add operations in parallel. These SIMD instructions are distinct from the ordinary scalar add operations, although the operation they perform on each SIMD element is (usually) identical to that performed on single scalar data by the corresponding scalar instruction.

Thus, instruction sets are usually a selection from the cross product comprising the basic semantic operation (add, multiply and so on), the scalarity (whether single scalar data or SIMD parallel data), and width (commonly some power of two number of bytes). It is not common for the instruction set to support the full cross product because it is so voluminous. Instead, only a selection of those combinations thought by the designer to be most useful are provided. This lack of orthogonally complicates the task of the compiler and other tools that must generate the instructions.

Figure 12:
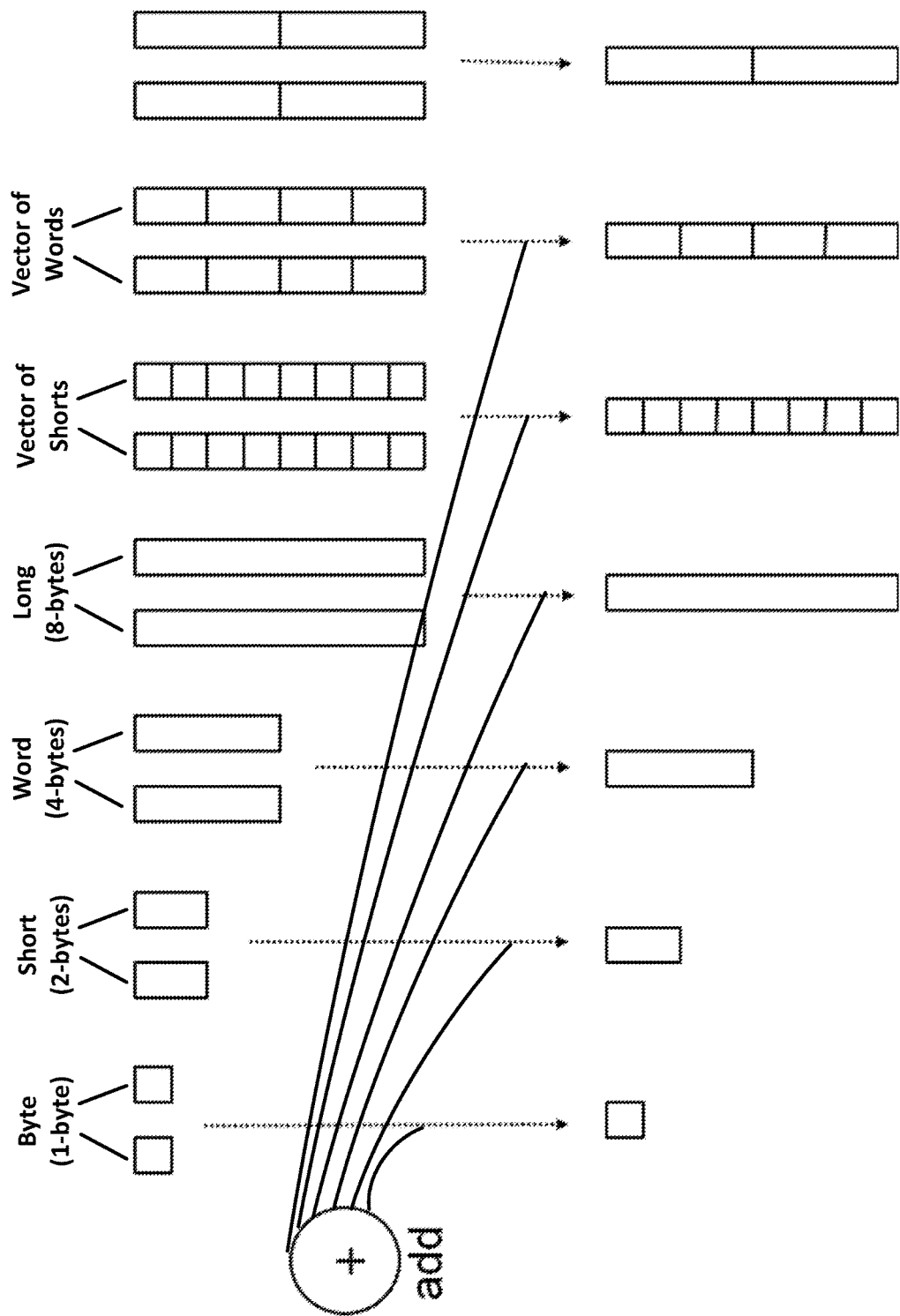
FIG. 12 is an illustration of operand width polymorphism that can be supported by the CPU of FIG. 1 for a representative add operation.

The scalarity tag of the meta-data for both scalar operand data elements and vector operand data elements as described herein can be used to remove the width and scalarity factors from the instruction set. Instead of conveying this information in the operation encoding, it is conveyed by the scalarity tag of the meta-data that is part of the scalar and vector operand data elements that are processed by the CPU 102. Thus, in essence, the operation says "add", while the data itself says "I am a one byte scalar" or "I am a SIMD vector of shorts". This is shown schematically in FIG. 12. In order to support this feature, the scalar and vector operand data elements (including the meta-data and payload of such operand data elements) are stored in the operand storage elements (e.g., belt, register file, special purpose registers and/or scratchpad) of the CPU 102 that are referenced by an addressing scheme (such as an logical belt address for the belt, a register index for a register file or special purpose register, or a scratchpad address for the scratchpad). The meta-data and payload parts of the respective scalar and vector operand data elements are read from and written to such operand storage elements as a unitary logical data element using the addressing scheme of the operand storage elements. For example, a scalar operand storage element stored in the belt at a logical belt address "b7" can be read from this operand storage element as a unitary logical data element using the logical belt address "b7". In another example, a vector operand storage element stored in the belt at a logical belt address "b3" can be read from this operand storage element as a unitary logical data element using the logical belt address "b3". The read and write operations that access the operand storage elements for processing the unitary operand data elements are operations that deal jointly with the operand data values and associated metadata together as unitary operand data elements. Furthermore, the data paths within the CPU 102 can be configured to carry the meta-data and payload parts of the scalar and vector operand data elements as a unitary logical data element, and the functional units of the CPU 102 can be arranged to input the meta-data and payload parts of the scalar and vector operand data elements as needed, process the width signals from the scalarity tag of the operand data element, rather than from the operation encoding, and configure themselves to process the operand data elements of the designated width as dictated by the input width signals.

For example, consider an add operation on a machine that supports 8-byte data as the largest size together with a functional unit that is configured as a 64-bit adder with the usual carry tree or chain. If the data claims to be (is tagged as) one-byte scalars then all bits after the least significant eight bits will be disabled to save power. If the data claims to be 4-byte words then bits after the least significant 32 bits are disabled, and so on. If the data claims to be a vector operand of bytes then all 64 bits participate, but the carry propagation is broken every eight bits to produce eight independent one-byte add operations. If the data claims to be a vector operand of 32-bit words then the carry propagation is broken after the 32nd bit to produce two independent 4-byte add operations, and so on. Other functional units can be organized equivalently.

Note that this structure permits detection of a number of categories of software error that are not usually caught. A conventional instruction set typically obtains operands from registers and returns results to registers, where the register is large enough to hold any size of operand and is indicated only by number. Consequently, on a machine without width tagging it is possible to compute a one-byte value and place it in a register, and later to use that register in a word-sized operation, which is typically an error. Similarly, trying to add a one-byte datum to a four-byte datum is probably an error. Lastly, some kinds of operations are simply not meaningful when applied to certain operand sizes—floating-point operations applied to one-byte data for example. These semantic violations can be detected and cause the condition to be reported to the program or operating system.

Figure 13:
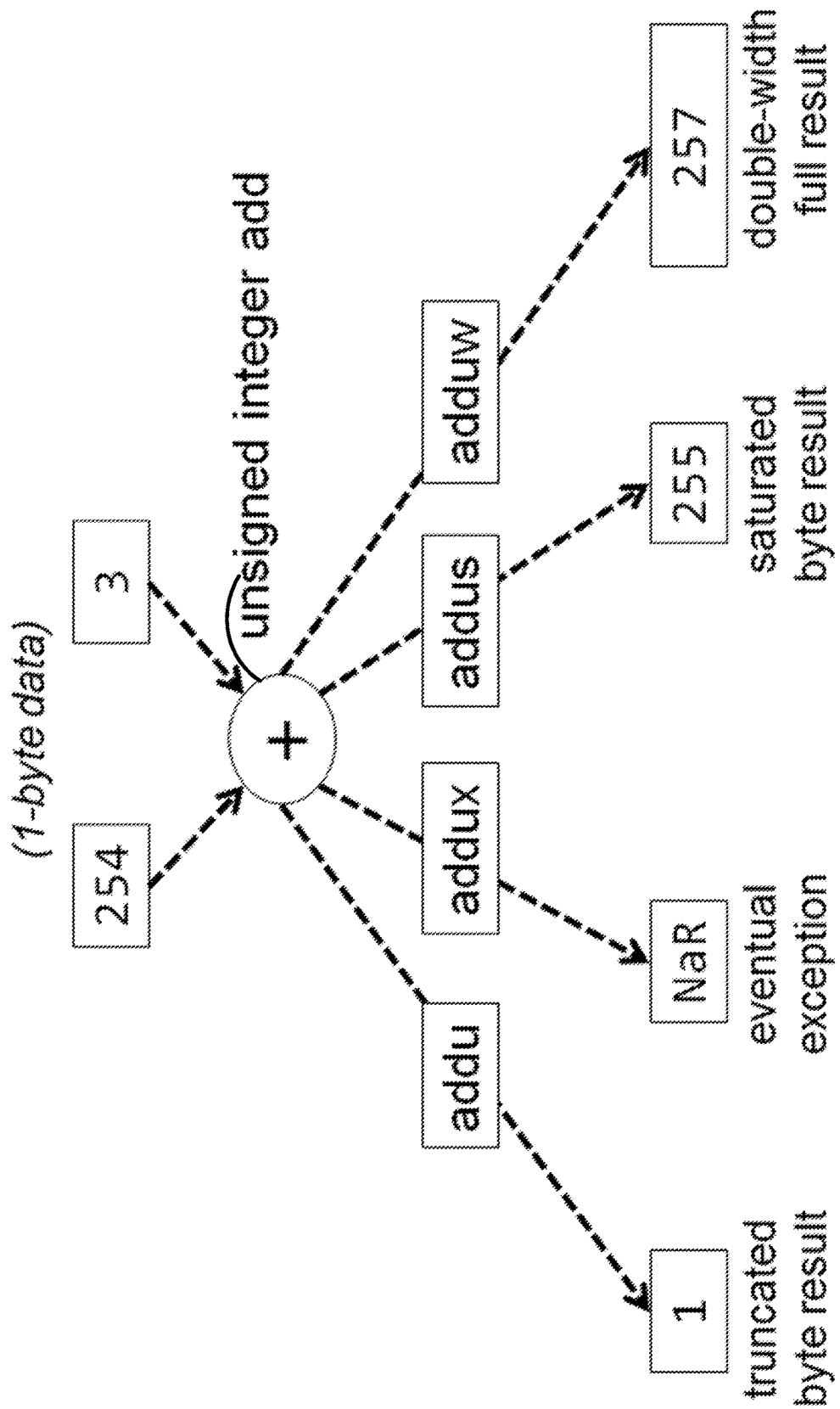
FIG. 13 is an illustration of a number of integer addition operations with different rules for the case of integer overflow; the CPU of FIG. 1 can be configured to support one or more of these integer addition operations.

Furthermore, the processing performed by the functional units of the CPU 102 can support different categories (flavors) of operations. For example, programming languages vary in the way they treat integer overflow that results from an unsigned integer add operation. Four possible variations are shown in FIG. 13. The functional units can be configured to support one or more of the four variations of the unsigned integer add operation (labeled addu, addux, addus and adduw as shown). Note that in the case of the addux variation, the scalar NAR can be used to indicate the overflow error condition for the operation as appropriate. Similar adaptations can be made to support various error conditions for a wide variety of speculable operations.

Figure 14B:
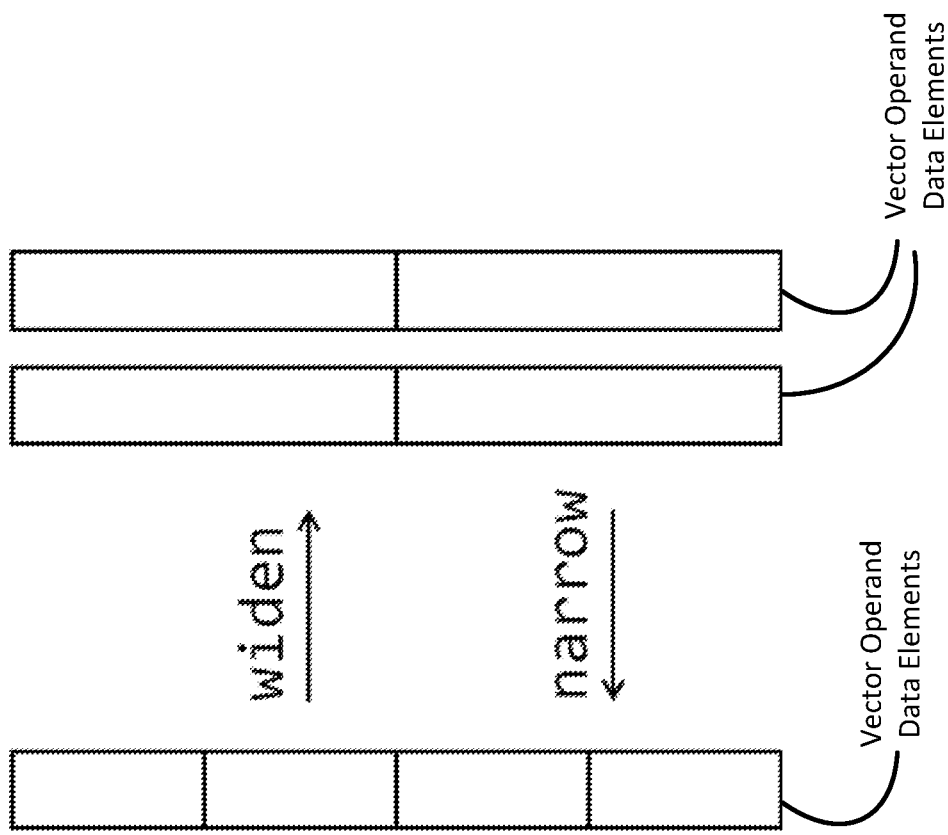
FIG. 14B is an illustration of vector widen and vector narrow operations that can be supported by the CPU of FIG. 1.
Figure 14A:
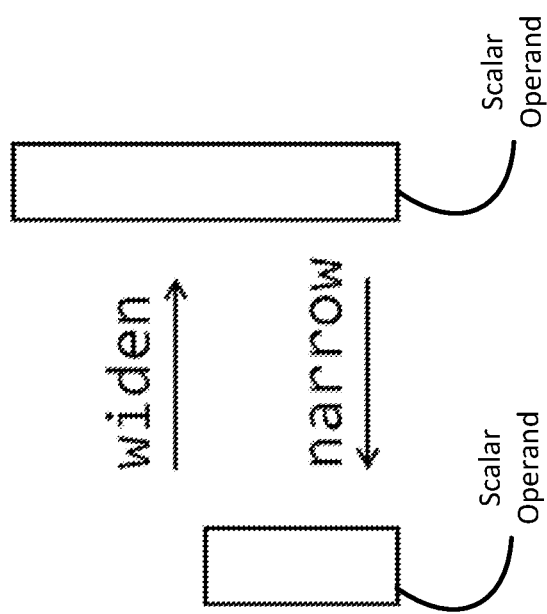
FIG. 14A is an illustration of scalar widen and scalar narrow operations that can be supported by the CPU of FIG. 1.

Furthermore, the CPU 102 can support a scalar widen operation that increases the size of a scalar operand data element argument and a scalar narrow operation that reduces the size of a scalar operand data element argument as shown schematically in FIG. 14A. Such operations can be specified by different opcodes that distinguish such operations from one another and from other operations that belong to the instruction set architecture of the computer processor. For example, the scalar widen operation can double the width of the payload of the scalar operand data element argument and update the scalarity tag of the result scalar operand data element as appropriate, and the scalar narrow operation can half the width of the payload of the scalar operand data element argument and update the scalarity tag of the result scalar operand data element as appropriate. The CPU 102 can also support a vector widen operation that increases the size of a payload data elements of a vector operand data element argument and a vector narrow operation that reduces the size of the payload data elements of a vector operand data element argument as shown schematically in FIG. 14B. For example, the vector widen operation can generate two result vector operand data elements whose payload data elements are double the width of the payload data elements of the vector operand data element argument. The scalarity tags of the two result vector operand data elements are based on the scalarity tag of the vector operand data element argument, which is updated to reflect the double width of the payload data elements as appropriate. The vector narrow operation can operate on two vector operand data element arguments and produce a single result vector operand data element whose data elements are half the width of the payload data elements of the two vector operand data element arguments. The scalarity tag of the single result vector operand data element is generated to reflect the half width of the payload data elements as appropriate. These operations can be useful to transform the size of the operand data into a designated size supported by the functional units of the CPU 102 when needed.

Note that it is possible to extend the operand data meta-data from the CPU proper into the memory hierarchy, so that every memory location (in cache or external memory) carries both operand data and its associated meta-data (or parts thereof). However, this is difficult and expensive to do with modern off-the-shelf memory technology. Consequently, the meta-data tagging of the operand data can be used only within the CPU proper and the operand data stored in the memory is untagged and thus not associated with any meta-data. In this case, the processing of the load operation that transfer data from the memory system 101 into the CPU 102 (e.g., loadbyte, loadshort, loadword, loaddouble, load-SIMD operations) are extended to generate the appropriate meta-data for the requested operand data and physically associate the meta-data with the requested operand data in the internal storage elements of the CPU 102. Alternatively, there can be a single generic load instruction that takes the intended tag as an argument. Furthermore, the processing of the store operations that transfer data from the CPU 102 into the memory system 101 are extended to disassociate the meta-data from the payload data of the requested operand data elements for storage of the payload data into the memory system 101 (without the meta-data associated therewith). Note that there is no need for the corresponding storebyte, loadshort, storeword, storedouble, storeSIMD operations because the scalarity tag of the meta-data conveys the width of the payload data being stored.

Note that the operand data meta-data could possibly be extended to carry type information that conveys the type of the scalar operand or vector elements (e.g., integer, floating-point type, decimal, fraction, etc.) as well as width, so that for example the same add operation could be used for both integer and floating-point data.

Conditional Pick Operation

Conditional branches are expensive in modern hardware. For example, consider the case where the program code contains a conditional branch of the form:
   if (a==0)
     b=c+2;
   else
     b=e−1;
In this case, the branch is costly because of the possibility of a mis-prediction of its direction and the necessary subsequent flush of the instruction decode pipeline. Consequently, many CPUs possess the capability to conditionally perform certain kinds of operations without the necessity of actually changing the flow of control, a technique called guarding. If we use "?" applied to the condition predicate to indicate that the following operation is conditional, the compiler might transform the above expression into:
   t1=c+2;
   t2=e−1;
   t3=a==0;
   t3?b=t1;
   !t3?b=t2;

That is, the add and subtract operations are speculatively executed into temporaries, as is the non-speculative compare operation, and then both moves are executed conditionally but with opposite conditions so that only one takes effect. The result requires only two execution cycles: one with the add, subtract, and compare, and one with both conditional moves. As a result the potentially expensive branch has been removed.

CPU architecture designs vary considerably in the way that they elide branches through conditional operations. In some cases only certain kinds of operations (commonly moves as in this example) may be made conditional. In other architectures the instruction set offers a conditional skip capability, where the condition is evaluated in one instruction and the following instruction is executed or skipped depending on the condition. This two-instruction sequence takes two instruction cycles because the second instruction takes a cycle whether skipped or executed, but saves the expensive branch and permits conditional execution of any kind of instruction. In another design, every (or most) instructions can be made conditional by including a condition to be evaluated (the guard) as part of the instruction. Like a conditional skip, this permits making any kind of instruction conditional, but takes only a single instruction cycle. However, it costs the instruction space for the guard even for unconditional instructions.

Figure 15A:
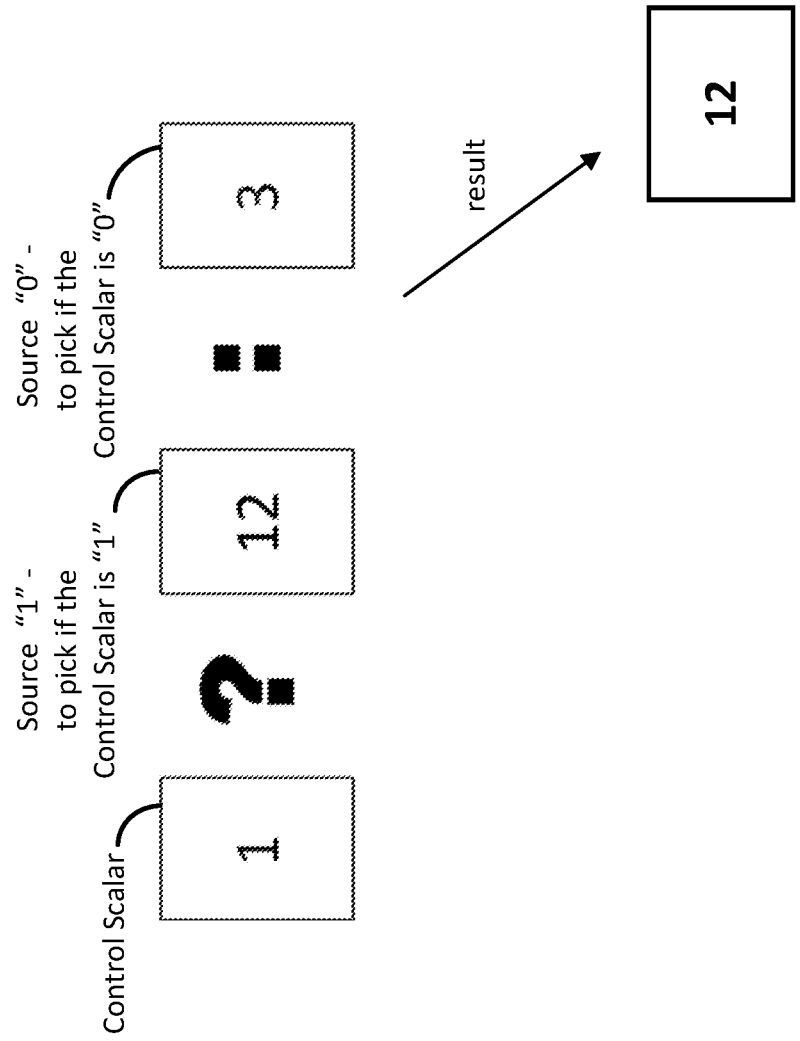
FIG. 15A is an illustration of a scalar pick operation that can be supported by the CPU of FIG. 1.

The CPU 102 of the present disclosure employs a different approach to elide branches. This approach employs a conditional selector operation (referred to herein as a scalar pick operation) that conditionally chooses one of two scalar operand data elements arguments (or one of two vector operand data element arguments) as its result based on the Boolean value of a control scalar operand data element input. The scalar pick operation can be specified by an opcode that distinguishes such operation from other operations that belong to the instruction set architecture of the computer processor. For sake of description, the scalar pick operation can be denoted with the "?:" as shown schematically in FIG. 15A. If the Boolean value of the control scalar operand data element is true ("1"), the first operand data element input (scalar or vector source operand "1") is selected for the result. If the Boolean value of the control scalar operand data element is false ("0"), the second operand data element input (scalar or vector source operand "0") is selected for the result. In the example shown, because the Boolean value of the control scalar operand data element is true ("1"), the first scalar source operand "1" input (whose value is "12") is selected for the result. The scalar pick operation is performed by hardware circuitry of the CPU 102.

Figure 15B:
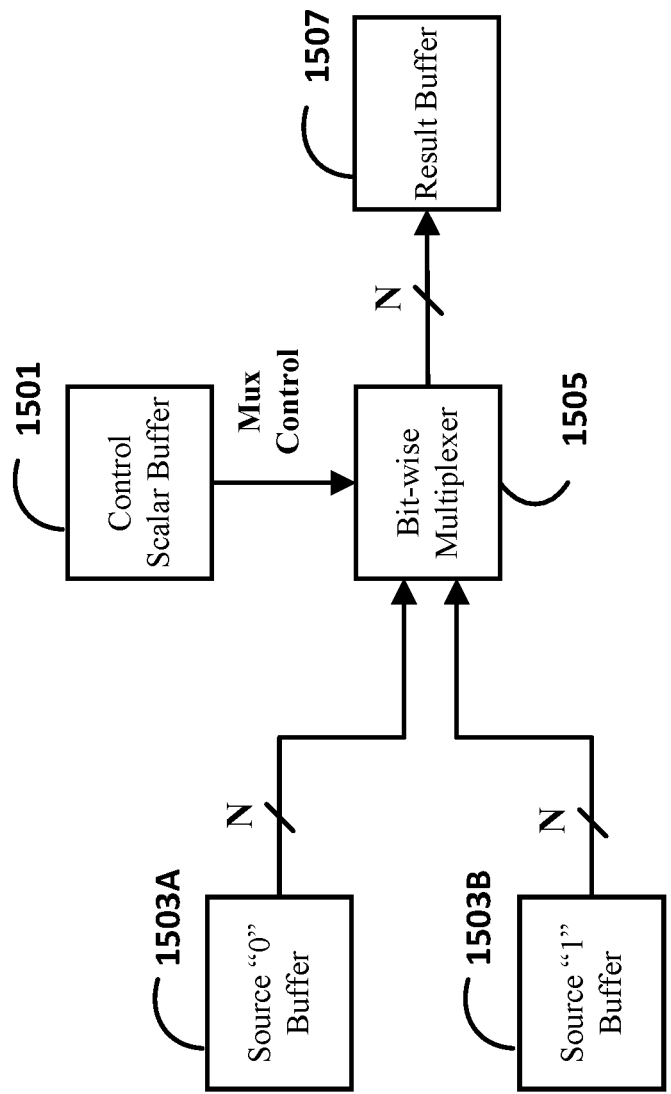
FIG. 15B is a schematic illustration of a hardware circuit that can be part of the CPU of FIG. 1 and carry out the scalar pick operation of FIG. 15A.

An example of hardware circuitry that performs the scalar pick operation is shown in FIG. 15B. The hardware circuitry includes a buffer circuit 1501 that is configured to store the control scalar operand and respective buffer circuits 1503A, 1503B that are configured to store the two scalar operand data arguments (or one of two vector operand data arguments), respectively. The hardware circuitry further includes a multiplexer circuit 1505 that operates under control of a mux control signal derived from the Boolean value of the control scalar operand stored in the buffer circuit 1501 to perform bit-wise multiplexing that copies the bit values of either the source operand "0" argument (scalar or vector source operand "0") stored in buffer circuit 1503A or the bit values of the source operand "1" argument (scalar or vector source operand "1") stored in buffer circuit 1503B to the result buffer circuit 1507. In this configuration, the result buffer circuit 1507 holds the resultant scalar operand (or vector operand) for output. Other suitable hardware implementations can be used as well.

Figure 16A:
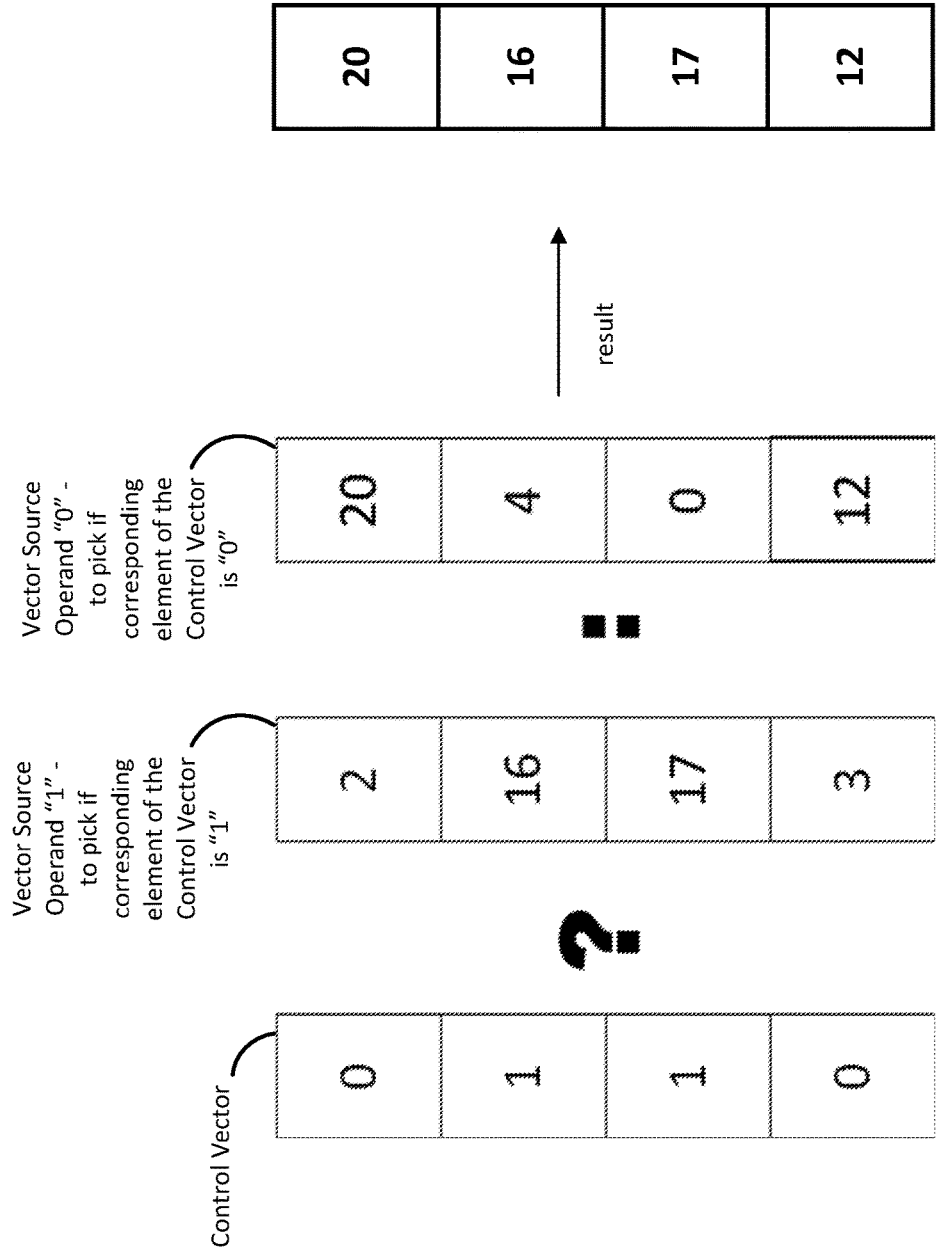
FIG. 16A is an illustration of a vector pick operation that can be supported by the CPU of FIG. 1.

The CPU 102 of the present disclosure can also employ a vector-based conditional selector operation (referred to herein as a vector pick operation) that conditionally chooses one of the two scalar payload data elements pairwise over the corresponding payload data elements of two vector operand data element arguments as part of its result vector based on the corresponding Boolean values of a control vector operand data element input. The vector pick operation can be specified by an opcode that distinguishes such operation from other operations that belong to the instruction set architecture of the computer processor. For sake of description, the vector pick operation can be denoted with the "?:" as shown schematically in FIG. 16A. If the Boolean value of the first scalar payload data element of the control vector input is false ("0"), the first scalar payload data element of the vector source operand "0" is selected for the result vector. If the Boolean value of the first scalar payload data element of the control vector input is true ("1"), the first scalar payload data element of the vector source operand "1" is selected for the result vector. If the Boolean value of the second scalar payload data element of the control vector input is false ("0"), the second scalar payload data element of the vector source operand "0" is selected for the result vector. If the Boolean value of the second scalar payload data element of the control vector input is true ("1"), the second scalar payload data element of the vector source operand "1" is selected for the result vector. These operations are repeated for the Boolean values of the remaining scalar payload data elements of the control vector input. In the example shown, because the Boolean value of the first scalar payload data element of the control vector input is false ("0"), the first scalar payload data element of the vector source operand "0" (the "20" value) is selected for the result vector. Because the Boolean value of the second scalar payload data element of the control vector input is true ("1"), the second scalar payload data element of the vector source operand "1" (the "16" value) is selected for the result vector. Because the Boolean value of the third scalar payload data element of the control vector input is true ("1"), the third scalar payload data element of the vector source operand "1" (the "17" value) is selected for the result vector. Because the Boolean value of the fourth scalar payload data element of the control vector input is false ("0"), the fourth scalar payload data element of the vector source operand "0" (the "12" value) is selected for the result vector. The vector pick operation is performed by hardware circuitry of the CPU 102.

Figure 16B:
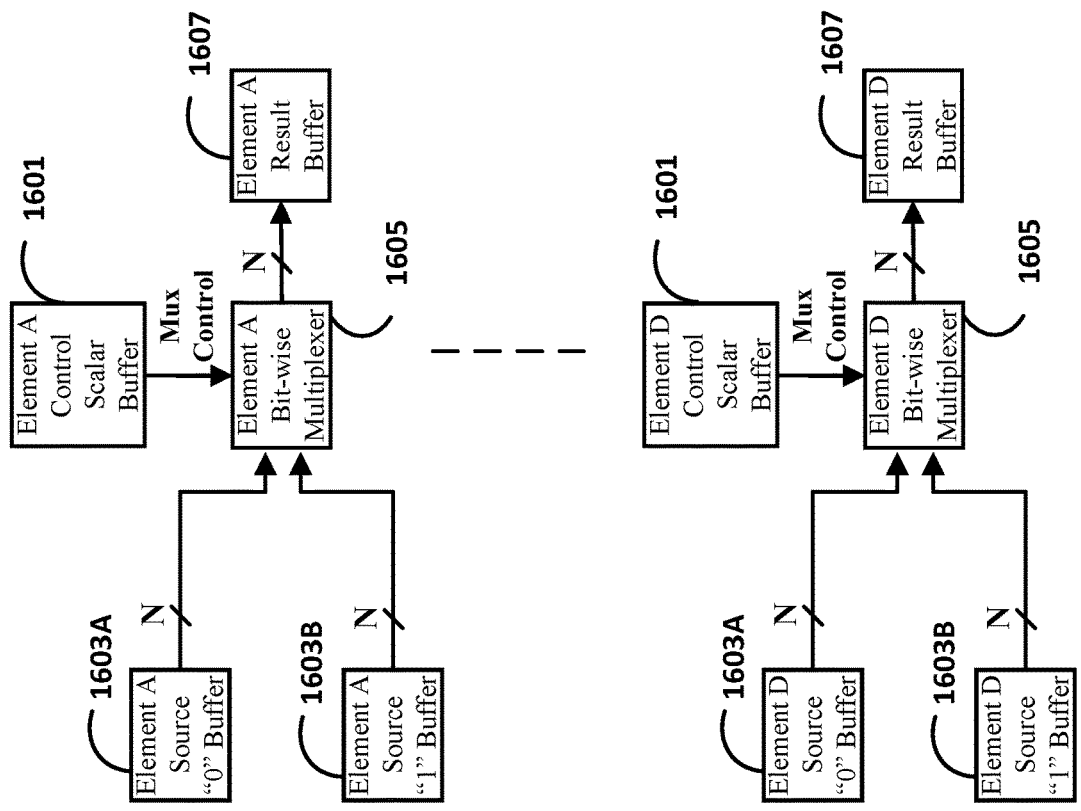
FIG. 16B is a schematic illustration of a hardware circuit that can be part of the CPU of FIG. 1 and carry out the vector pick operation of FIG. 16A.

An example of hardware circuitry that performs the vector pick operation is shown in FIG. 16B. The hardware circuitry includes similar circuit elements of FIG. 15B that are replicated for each scalar element of the control vector input. Specifically, the circuitry for a particular scalar element of the control vector input includes a buffer circuit 1601 that is configured to store the scalar element of the control vector input and respective buffer circuits 1603A, 1603B that are configured to store the two corresponding scalar elements of the vector operand data arguments, respectively. The hardware circuitry further includes a multiplexer circuit 1605 that operates under control of a mux control signal derived from the Boolean value of the scalar element of the control vector input stored in the buffer circuit 1601 to perform bit-wise multiplexing that copies the bit values of either the corresponding scalar element of the vector source operand "0" argument stored in buffer circuit 1603A or the bit values of the corresponding scalar element of the vector source operand "1" argument stored in buffer circuit 1603B to the result buffer circuit 1607 for the corresponding element of the result vector. In this configuration, the result buffer circuits 1607 hold all of the elements of the resultant vector for output. Other suitable hardware implementations can be used as well.

The scalar pick operation can be used to transform the example expression into the following:
t1=c+2;
t2=e−1;
t3=a==0;
t4=t3?t1:t2; scalar pick operation
b=t4;

Note that it is not possible to use the scalar pick operation to make some arbitrary operation conditional, the way a guard or conditional skip can do. In addition, a scalar pick operation does not lend itself to code which has only one of the two possibilities.

For example, consider the following code sequence:
if (a==0)
b=2;
A conditional move operation (or the guard or skip equivalent) can be used to transform this sequence into the following:
t1=a==0;
t1?b=2;
In contrast, the scalar pick operation can be used to transform this sequence into the following:
t1=a==0;
t2=t1?2:b; scalar pick operation
b=t2;
In this case, the value is copied over onto itself down one of the paths. This may be more expensive than the conditional move form.

However, the scalar pick operation can be used in conjunction with a None operand as described herein in order to conditionally select a single scalar or vector operand data element based on the Boolean value of a control scalar operand data element input. For example, consider the following example code sequence:
if (a==0)
b=2;
The scalar pick operation can be used in conjunction with a None operand to translate this code sequence to:
t1=a==0;
t2=t1?2:None; scalar pick operation with None
b=t2;
Note that after the scalar pick operation, the value of t2 is either 2 or None depending on the value of the Boolean condition t1. If the value of the Boolean condition t1 is false ("0"), then the value of t2 is selected as 2. If the value of the Boolean condition t1 is true ("1"), then the value of t2 is None. The following assignment b=t2 causes b to become 2 if the value of the Boolean condition t1 is false (a does not equal 0) or is skipped and the value of b remains unchanged if the value of the Boolean condition t1 is true (a equals 0).

Furthermore, the vector pick operation can be used in conjunction with a None operand as described herein in order to conditionally select a single scalar payload data element based on the Boolean value of a corresponding payload element of a control vector. Examples of such vector-based operations are described herein with respect to the remaining operation.

Loop-Vectorization Control Operations

Performance of a CPU executing a program is largely determined by how many operations the CPU can execute in a given period of time. This number can be increased by reducing the time it takes to execute a single instruction; reducing the time while the CPU is not executing any instructions because it is waiting for some resource to become available; and by executing more than one instruction at a time, in parallel. There have been many schemes invented for the latter, and one of the more successful is called SIMD (single-instruction-multiple-data) processing.

A SIMD instruction is processed and issued by the CPU in the same manner as non-SIMD (scalar) instructions. However, the hardware of the functional units for processing the SIMD instruction is replicated so that some number (the replication factor or SIMD fanout) of identical adders, multipliers, or other functional unit performs the operations of the SIMD instruction. The operations are carried out in parallel. Each functional unit receives different data one which to apply the operation. The data operated on by a single unit is typically called an element, so that fanout number of elements will participate in the computation specified by the SIMD instruction.

Commonly the elements participating in a SIMD instruction are logically contiguous with each other and may be thought of as a short section or vector of a larger array of data. If a particular operation is to be performed for every element of some large array of data, a scalar functional unit must execute the instruction for each array element, whereas a SIMD instruction can execute a vector at a time, reducing the number of instructions executed by a factor of the SIMD fanout. For example, if the fanout is 4 and the number of data elements in the array is 32, then performing the operation on a scalar machine will require executing the instruction (typically in a loop) 32 times, but on the SIMD machine will require execution only 8 times.

Of course, this works only when the number of elements is evenly divisible by the SIMD fanout. If there were 30 elements in the array rather than 32, then the last vector would contain only two elements and not the full fanout of 4. There have been a number of schemes developed to address this problem. In some CPUs the hardware contains an element counter that disables the computation for elements that are "past the end". In others a bit mask serves the same purpose, where a bit in the mask corresponds to each vector element and tells the instruction whether or not the operation is to be performed for that element. However, the most common approach is for the supporting functional units of the CPU to operate only on full vectors, with compiler generated code performing the computation for any left-over elements using scalar rather than SIMD instructions. Thus, in the example of 30 elements, a main loop would execute SIMD instructions seven times, handling 28 elements, and then following code would do the last two elements with scalar instructions.

This suffices for situations when the actual number of elements is known or can be computed at the start of the main loop, which is the case when the entirety of an array is to be computed upon. Loops of this form are called for-loops after the usual programming language notation for such an action.

However, there is an important class of computations where the number of elements is not and cannot be known at the beginning, but is determined by some characteristic of the data itself. For example, the operation may be to be performed only on the elements up to the first one that has some particular value, say zero. Loops of this form are called while-loops, also after the programming language notation that expresses the notion. Searches (where an array is scanned looking for a particular value) are a typical example. In general, while-loop code cannot be handled by the supporting functional units of the CPU because the termination condition might happen on any element and so the SINE) instruction would incorrectly apply the operation to those elements that are in the vector but after the terminating element, a condition called SIMD overrun.

Compilers may still generate SIMD instructions for while-loops when it can be determined that executing the operation on overrun elements is innocuous. However, most operations have side effects that make overrun execution semantically invalid. SIMD instructions can also be used when it is possible to reverse the effect of overrun execution after the loop terminates, and some CPUs contain special hardware to do this reversal. However, such clean-up code is often very tricky to get right and substantially increases the size of the generated code, with unfortunate consequences in cache behavior. Lastly, if there is substantial work to be done on each vector beyond checking for the termination condition then the compiler may generate scalar code that checks the elements one by one for termination, and then does the rest of the work in SIMD if the termination hasn't happened. All these possibilities complicate the compiler considerably and are a frequent source of bugs and semantic corner cases. Still, the benefit of successful program of SIMD is so great that essentially all modern CPUs contain some SIMD instructions, even though they cannot be used with while-loops.

The CPU 102 of the present disclosure can employ a vector operation (referred to herein as the vector smear operation) that permits one or more SIMI) instructions to be processed as part of a while-loop, even when the operations are not innocuous when performed on overrun elements. No clean-up code or scalar pretesting is needed. The vector smear operation can be specified by an opcode that distinguishes such operation from other operations that belong to the instruction set architecture of the computer processor. It is applicable to any implementation supporting bit mask enables for SIMD operations, a common SIMD feature.

The vector smear operation operates on an input vector argument of Boolean values (such as a vector operand data element of Boolean values). In one example, the Boolean false is represented by binary zero and the Boolean true is represented by a binary one. The input vector argument is typically the result of a SIMD relational operation applied to a data vector, for example a comparison for equality with zero. In this case, each element of the input vector argument would then indicate whether the corresponding data element satisfied the predicate. The vector smear operation produces a resultant vector (and possibly an extra element) of Boolean values whose pattern corresponds to the first true element in the input vector argument that satisfies the predicate (i.e., represents the Boolean true value). The result vector can be stored in one or more operand storage data elements (or in memory) as specified by an index (or memory address) that is part of the encoding of the vector smear operation. The index of operand storage data elements used to store the result vector can possibly be omitted from the encoding of the vector smear operation where temporal addressing is used to store results, such as where the operand storage elements are organized as a logical belt as described in U.S. patent application Ser. No. 14/312,159 filed on Jun. 23, 2014, commonly assigned to assignee of the present application and incorporated by reference above in its entirety. Whereas a normal SIMD operation performs the same operation on every element of the data vector in parallel, the vector smear operation logically examines the elements of the input vector argument in sequence, comparing each element with the scalar value true. The result vector (and possibly an extra element) contains a Boolean false value for each element up to the first true element (or possibly for one after the first true element), and contains Boolean true values for the elements of the result vector thereafter. This result vector (and possibly the extra element) may then be used as a guard mask to control the execution of SIMD operations as part of a while-loop, so that those operations are applied only to valid elements and not to overrun elements, or are applied only to overrun elements and not to valid elements. Note that the last element result vector (or possibly the extra element) of the vector smear result shows whether the termination condition had been detected. This can be used to terminate the while loop. Note that the operation can return a separate additional scalar result that shows whether the test was satisfied by any element.

In one embodiment, the CPU 102 can support one or both of two different variants of vector smear operations, referred to as an exclusive vector smear operation and an inclusive vector smear operation. The exclusive and exclusive vector smear operations can be specified by different opcodes that distinguish such operations from one another and from other operations that belong to the instruction set architecture of the computer processor.

Figure 17A:
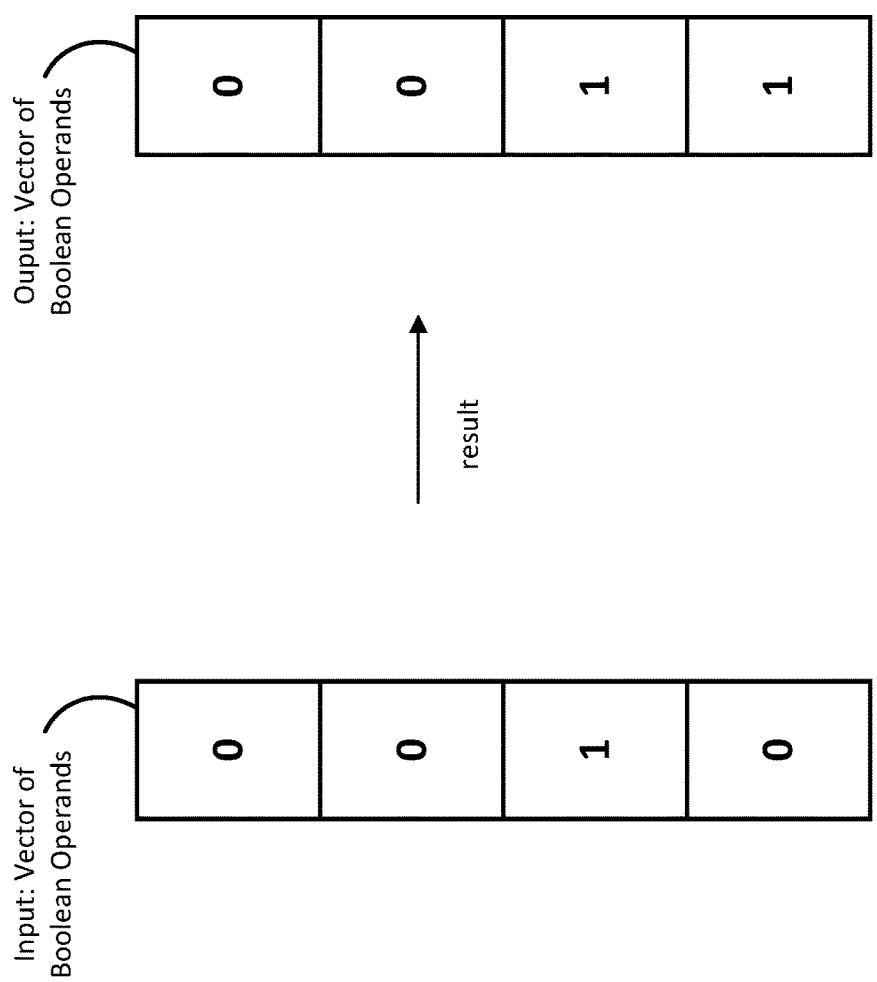
FIG. 17A is an illustration of a vector smear (exclusive) operation that can be supported by the CPU of FIG. 1.

The exclusive vector smear operation is shown schematically in FIG. 17A. This operation operates on an input vector argument of Boolean values, and produces a result vector that has the same number of elements of the input vector argument. The result vector contains a Boolean false value for each element up to the first true element of the input vector argument, and contains Boolean true values for the elements of the result vector thereafter. The result vector can be stored in one or more operand storage data elements (or in memory) as specified by an index (or memory address) that is part of the encoding of the exclusive vector smear operation. The index of operand storage data elements used to store the result vector can possibly be omitted from the encoding of the exclusive vector smear operation where temporal addressing is used to store results.

Figure 17B:
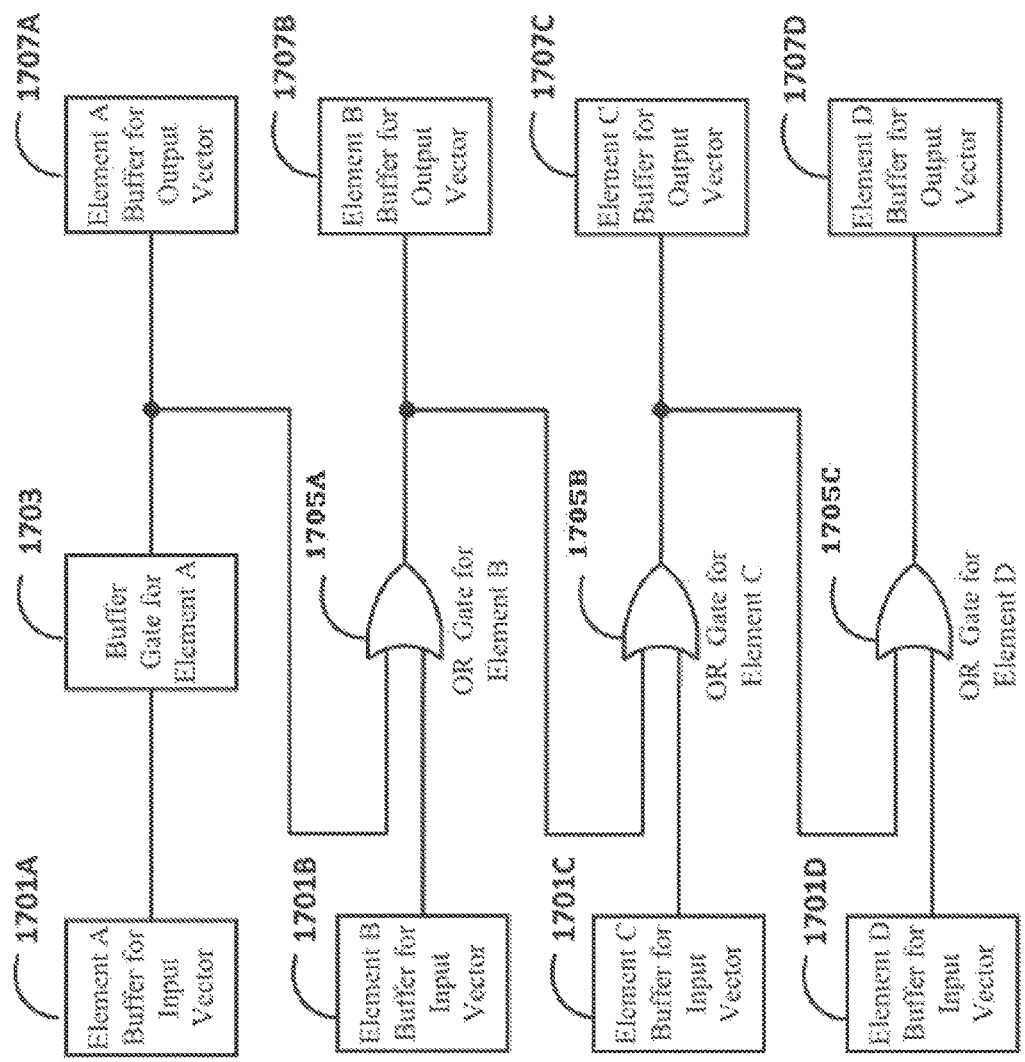
FIG. 17B is a schematic illustration of a hardware circuit that can be part of the CPU of FIG. 1 and carry out the vector smear (exclusive) operation of FIG. 17A.

An example of hardware circuitry that performs the exclusive vector smear operation for an input vector argument of four Boolean values is shown in FIG. 17B. The hardware circuitry includes buffer circuits 1701A, 1701B, 1701C, 1701D that are configured to store the elements (the four Boolean values) of the input vector argument, respectively. The hardware circuitry further includes a buffer gate 1703 that copies the first element (the first one of the four Boolean values) of the input vector argument as stored in the buffer circuit 1701A to a buffer circuit 1707A for the first element of the output vector. The hardware circuitry further includes a two-input OR gate 1705A. The output of the buffer circuit 1703 (which corresponds to the first Boolean value of the input vector argument) is supplied to one input of the OR gate 1705A. The second element (the second one of the four Boolean values) of the input vector argument as stored in the buffer circuit 1701B is supplied to the other input of the OR gate 1705A. The output of the OR gate 1705A (which corresponds to the logical OR of the first and second Boolean values of the input vector argument) is stored in the buffer circuit 1707B for the second element of the output vector. The output of the OR gate 1705A is also supplied to one input of the OR gate 1705B. The third element (the third one of the four Boolean values) of the input vector argument as stored in the buffer circuit 1701C is supplied to the other input of the OR gate 1705B. The output of the OR gate 1705B (which corresponds to the logical OR of the third Boolean value and the previous Boolean values of the input vector argument) is stored in the buffer circuit 1707C for the third element of the output vector. The output of the OR gate 1705B is also supplied to one input of the OR gate 1705C. The fourth element (the fourth one of the four Boolean values) of the input vector argument as stored in the buffer circuit 1701D is supplied to the other input of the OR gate 1705C. The output of the OR gate 1705C (which corresponds to the logical OR of the fourth Boolean value and the previous Boolean values of the input vector argument) is stored in the buffer circuit 1707D for the third element of the output vector. In this configuration, the result buffer circuits 1707A, 1707B, 17070, 1707D hold all of the four elements (the four Boolean values) of the resultant vector for output. Other suitable hardware implementations can be used as well.

Figure 18A:
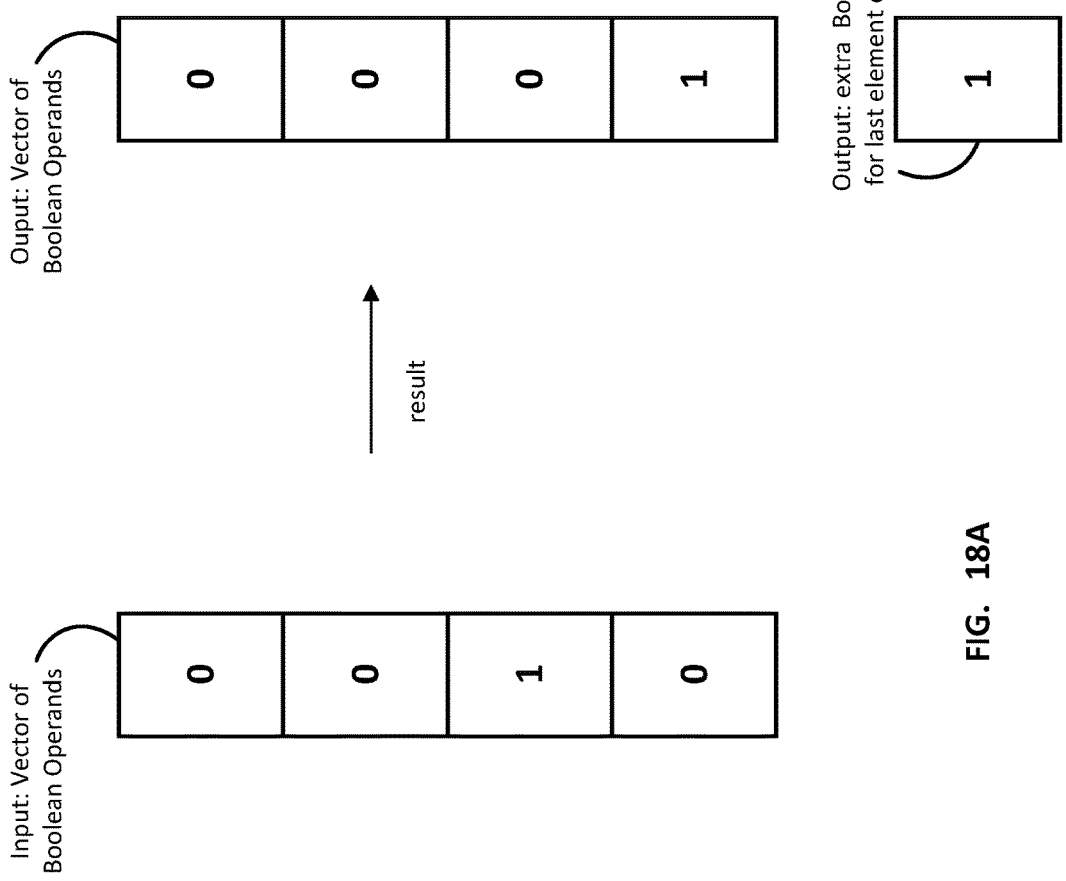
FIG. 18A is an illustration of a vector smear (inclusive) operation that can be supported by the CPU of FIG. 1.

The inclusive vector smear operation is shown schematically in FIG. 18A. This operation operates on an input vector argument of Boolean values, and produces a result vector that has the same number of elements of the input vector argument as well as an additional element. The result vector contains a Boolean false value for each element up to and including the first true element of the input vector argument, and contains Boolean true values for the elements of the result vector thereafter. The additional element of the result indicates whether the last element (or any previous element) of the input vector argument contains a Boolean true value. If the result vector contains all Boolean false values and the additional element of the result indicates that the last element of the input vector argument contains a Boolean true value, then the result indicates that only the last element of the input vector argument contains a Boolean true value. The result vector and the additional element of the result can be stored in operand storage data elements (or in memory) as specified by indices (or a memory address) that is part of the encoding of the inclusive vector smear operation. The indices of the operand storage data elements used to store the result vector and additional result element can possibly be omitted from the encoding of the inclusive vector smear operation where temporal addressing is used to store results.

Figure 18B:
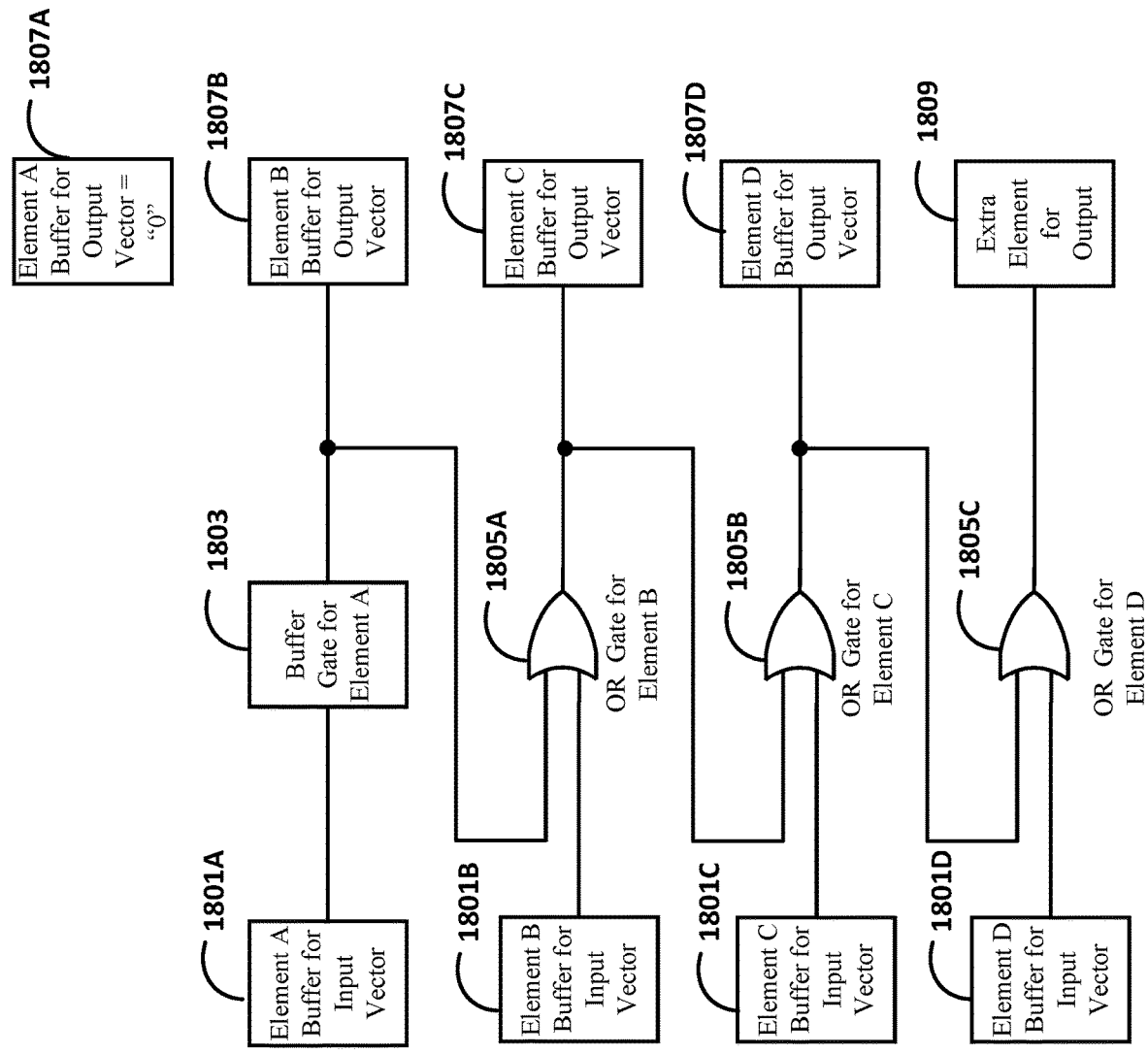
FIG. 18B is a schematic illustration of a hardware circuit that can be part of the CPU of FIG. 1 and carry out the vector smear (inclusive) operation of FIG. 18A.

An example of hardware circuitry that performs the inclusive vector smear operation for an input vector argument of four Boolean values is shown in FIG. 18B. The hardware circuitry includes buffer circuits 1801A, 1801B, 1801C, 1801D that are configured to store the elements (the four Boolean values) of the input vector argument, respectively. The hardware circuitry further includes a buffer circuit 1807A that stores a false Boolean value for the first element of the output vector as well as a buffer gate 1803 that copies the first element (the first one of the four Boolean values) of the input vector argument as stored in the buffer circuit 1801A to a buffer circuit 1807B for the second element of the output vector. The hardware circuitry further includes a two-input OR gate 1805A. The output of the buffer gate 1803 (which corresponds to the first Boolean value of the input vector argument) is supplied to one input of the OR gate 1805A. The second element (the second one of the four Boolean values) of the input vector argument as stored in the buffer circuit 1801B is supplied to the other input of the OR gate 1805A. The output of the OR gate 1805A (which corresponds to the logical OR of the first and second Boolean values of the input vector argument) is stored in the buffer circuit 1807C for the third element of the output vector. The output of the OR gate 1805A is also supplied to one input of the OR gate 1805B. The third element (the third one of the four Boolean values) of the input vector argument as stored in the buffer circuit 1801C is supplied to the other input of the OR gate 1805B. The output of the OR gate 1805B (which corresponds to the logical OR of the third Boolean value and the previous Boolean values of the input vector argument) is stored in the buffer circuit 1807D for the fourth element of the output vector. The output of the OR gate 1805B is also supplied to one input of the OR gate 1805C. The fourth element (the fourth one of the four Boolean values) of the input vector argument as stored in the buffer circuit 1801D is supplied to the other input of the OR gate 1805C. The output of the OR gate 1805C (which corresponds to the logical OR of the fourth Boolean value and the previous Boolean values of the input vector argument) is stored in the buffer circuit 1809 for the additional scalar output of the operation. In this configuration, the result buffer circuits 1807A, 1807B, 1807C, 1807D hold the four elements (the four Boolean values) of the resultant vector and the result buffer circuit 1809 holds the additional scalar value for output. Other suitable hardware implementations can be used as well.

Consider as an example a while loop that increments all elements of an array up to but not including the first element with a zero value. In the language C this would be the program:
int i=0;
while (A[i]!=0) {
++A[i];
++i;
}
The machine code for the body of this while loop would perform the following actions:
fetch the next vector Vi of elements from the array
perform a SIMD equal compare of the fetched vector Vi with the value zero to yield a vector $V_B$ of Boolean values, where a true in an element position indicates that the data element was zero and a false indicates that it was non-zero. Note that there may be zero, one, or more matches.
perform a vector smear operation (such as the exclusive vector smear operation) on the vector $V_B$ to yield a resultant guard vector $V_G$ of Booleans
perform a SIMD increment operation on the vector Vi, under the control of the guard vector $V_G$ where only elements before the first Boolean true of the guard vector $V_G$ are incremented
store the partially incremented vector Vi back into the array
if the last element of the guard vector $V_G$ is true (or other test for termination is true) then exit the loop, and if false then branch back and repeat the loop
Thus, the entire while loop is done a whole vector at a time, with no cleanup code. This dramatically improves the performance of the CPU on while loops, at no cost other than the implementation of vector smear itself, which is quite minor in modern CPU technology.

Some while loops perform their action on all elements up to but not including the element for which the terminating condition is true, whereas others perform it for all elements up to and including the terminating element. The previous example was the former case, while the Unix utility strcpy is the latter case. The strcpy function is defined to copy a sequence of bytes from one location to another, up to and including a terminating null byte. This can be implemented by the inclusive vector smear operation, and the resulting vector of Boolean values may then be used as a guard bitmask in the same manner as previously described.

This description reflects the vector smear operation operating on a single vector of Boolean values. However, the underlying notion can be applied in other contexts as well. For example, a dyadic smear taking a data vector and a scalar could scan the data looking for a match with the scalar, and produce a result vector of Boolean values that has false elements to the point of match and true thereafter. Or the sense of the test could be reversed, replacing true with false and vice versa in the result as described. Lastly in some SIMD implementations the SIMD relational operators directly produce a guard bitmask rather than a vector of Boolean values. The vector smear operation can then be defined to work on the guard bits themselves, propagating the first true bit into all subsequent bits in the mask. The mask can then be used to disable subsequent SIMD operations on overrun elements.

The CPU 102 of the present disclosure can also employ a vector operation (referred to herein as the remaining operation) that permits one or more SIMD instructions to be processed as part of a counting loop. The remaining operation can be specified by an opcode that distinguishes such operation from other operations that belong to the instruction set architecture of the computer processor. A counting loop is one that executes a fixed number (the count) of iterations, determined either at compile time (static scheduling) or by computation at run time (dynamic scheduling), as opposed to while loops which iterate until a condition predicate is satisfied. The counting loop is vectorized when several iterations are executed simultaneously in parallel, using vector data which are short arrays of values rather than scalar data which are single values. Each scalar iteration is mapped to one element of the vector, and the loop is executed in SIMD style.

The number of data elements in the vector (the vector length) determines how many of the scalar iterations can be executed in parallel in one vector iteration. For implementation reasons the vector length can be limited to a power of two. A problem occurs then the overall count for the loop is incommensurate with the vector length. For example, if the count is 58 and the vector length is eight, then seven vector iterations, each the equivalent of eight scalar iterations, could be executed for a total of 56 scalar iterations. However, the remaining two iterations do not fill a whole vector. Simply doing another vector iteration would be incorrect and potentially disastrous to the program.

The common method to deal with incommensurate vectors is to use vector iterations as long as vectors can be filled, and then drop to scalar iterations for the remainder. This approach requires duplicating the code, and the scalar iterations are slow.

The remaining operation of the present disclosure can avoid the use of scalar iterations. Instead, a partially-occupied vector iteration is executed under control of a vector mask of Boolean values whose contents indicate which of the implied scalar iterations are valid and which are to be skipped. This vector mask is used as the predicate argument to the vector pick operation in which one of the data arguments is a vector of data corresponding to both the correct iterations and the iterations past the end of the count, and the other data argument is a vector of None values for the iterations past the end of the count. In this configuration, the resulting vector from the vector pick operation contains valid data for the iterations within the count and None for the iterations beyond the count. This partial vector may then be used in an ordinary vector iteration using the same code as was used for full vectors, and the semantics of None ensure that the iterations beyond the count have no visible program consequence.

In addition, the remaining operation returns a second result, a scalar Boolean value. This Boolean value is false if the count was greater than the vector length (implying that further vector iterations are necessary) and true otherwise (implying that no further vector iterations are necessary). This Boolean may be tested by the conditional branch that closes the loop.

Figure 19A:
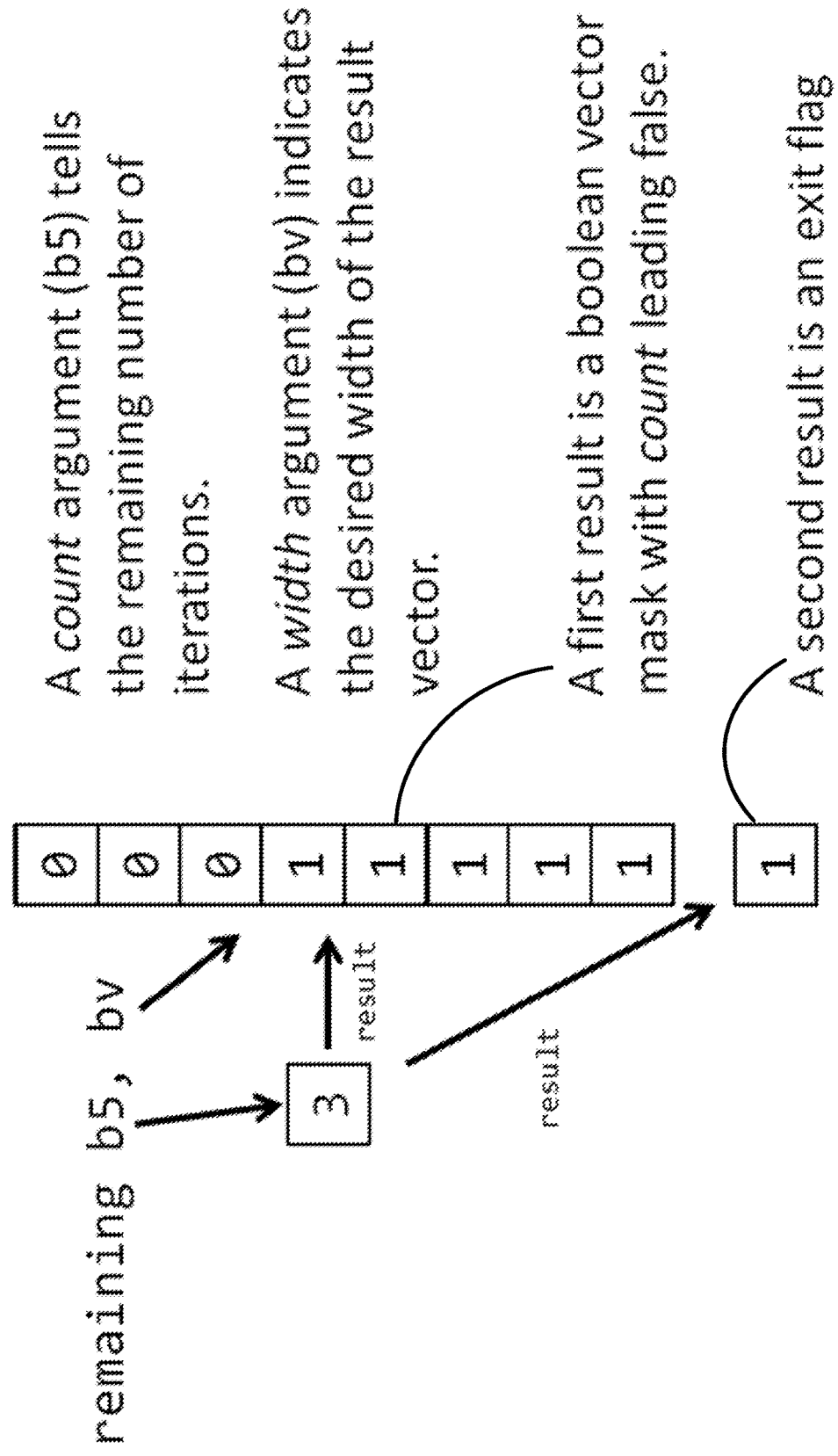
FIG. 19A is an illustration of a remaining operation that can be supported by the CPU of FIG. 1.

To use the remaining operation, the initial count as determined by the loop conditions is decremented by the vector length during each vector iteration. The count value before the decrement is used as an input argument to the remaining operation along with a width argument that indicates the desired width of the result vector as shown in FIG. 19A. The count and width input arguments are used to create a vector of Boolean values with a number of leading false values as specified by the count input argument. This result vector is referred to as a Boolean vector mask in FIG. 19A. The remaining operation also produces a scalar Boolean value which is false if the count was greater than the vector length (implying that further vector iterations are necessary)

and true otherwise (implying that no further vector iterations are necessary). This scalar Boolean value is referred to as an exit flag in FIG. 19A. The exit flag may be tested by the conditional branch that closes the counting loop. As part of the iteration of the counting loop, the vector mask produced by the remaining operation can be used to create whole or partial data vectors using the vector pick operation as described herein. Iteration of the counting loop can be terminated when the exit flag indicates that all count scalar iterations have been performed.

Figure 19B:
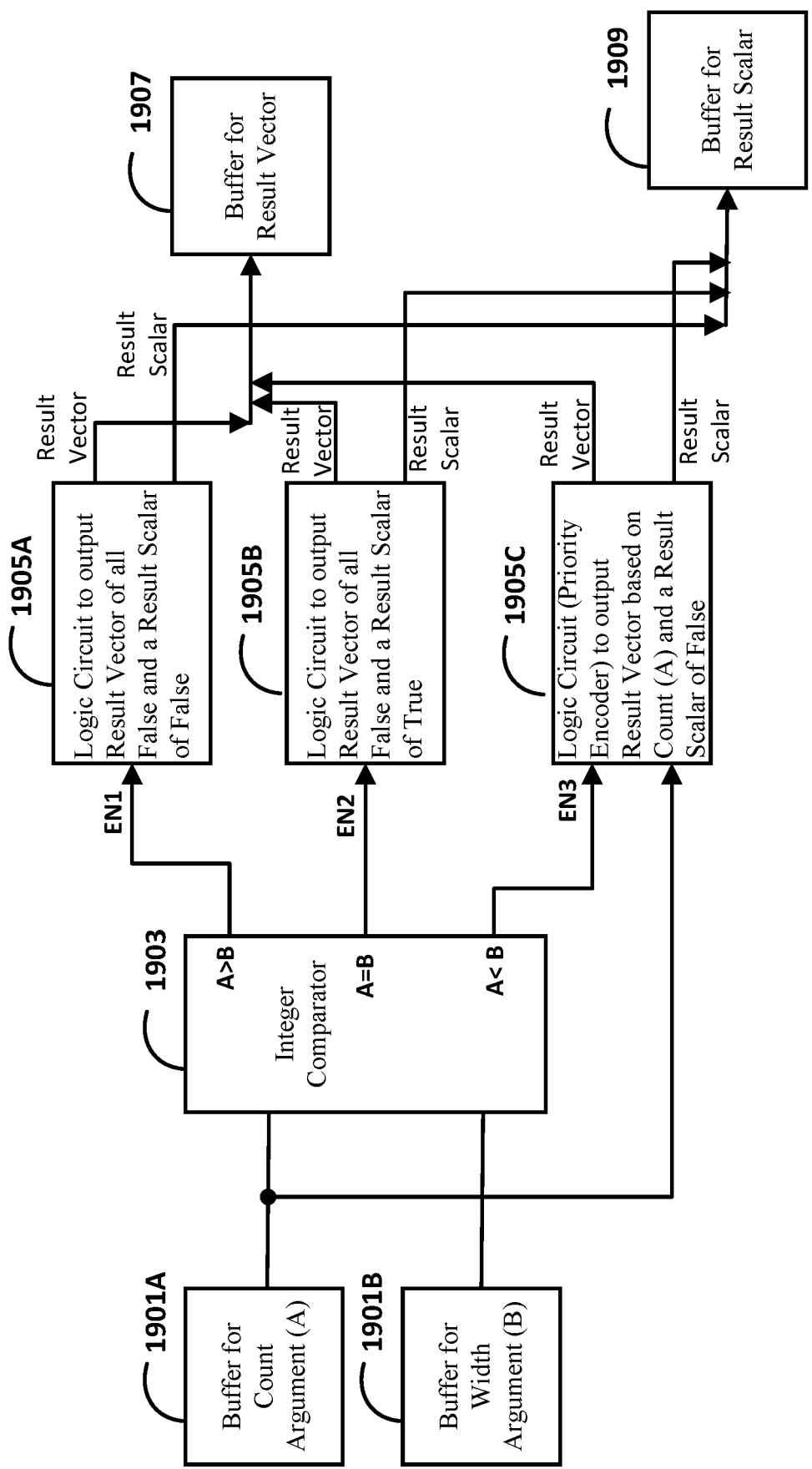
FIG. 19B is a schematic illustration of a hardware circuit that can be part of the CPU of FIG. 1 and carry out the remaining operation of FIG. 19A.

An example of hardware circuitry that performs the remaining operation is shown in FIG. 19B. The hardware circuitry includes buffer circuits 1901A and 1901B that hold the count argument (labeled "A") and the width argument (labeled "B") of the remaining operation. The hardware circuitry further includes an integer comparator circuit 1903 that compares the count argument ("A") as stored in the buffer circuit 1901A to the width argument ("B") stored in the buffer circuit 1901B. The integer comparator circuit 1903 outputs enable signals EN1, EN2 and EN3 according to the result of the compare operation. When the count argument ("A") is greater than the width argument ("B"), the integer comparator circuit 1903 outputs the EN1 signal that enables the logic circuit 1905A. When enabled by the EN1 signal, the logic circuit 1905A outputs a result vector of all false Boolean values (where the width argument dictates the width of the result vector) and a result scalar value of false. The result vector output by the logic circuit 1905A is stored in a buffer circuit 1907 for the result vector. In this case, the result scalar output by the logic circuit 1905A is stored in a buffer circuit 1909 for the result scalar. When the count argument ("A") is equal to the width argument ("B"), the integer comparator circuit 1903 outputs the EN2 signal that enables the logic circuit 1905B. When enabled by the EN2 signal, the logic circuit 1905B outputs a result vector of all false Boolean values (where the width argument dictates the width of the result vector) and a result scalar value of true. In this case, the result vector output by the logic circuit 1905B is stored in the buffer circuit 1907 for the result vector. The result scalar output by the logic circuit 1905B is stored in the buffer circuit 1909 for the result scalar. When the count argument ("A") is less than the width argument ("B"), the integer comparator circuit 1903 outputs the EN3 signal that enables the logic circuit 1905C. When enabled by the EN3 signal, the logic circuit 1905C operates as a priority encoder to output a result vector according to the value of count argument stored in the buffer circuit 1901A. The width argument stored in the buffer circuit 1901B dictates the width of the result vector. This operation create a vector of Boolean values with a number of leading false values as specified by the count input argument. The logic circuit 1905C also produces a result scalar value of false. In this case, the result vector output by the logic circuit 1905C is stored in the buffer circuit 1907 for the result vector. The result scalar output by the logic circuit 1905C is stored in the buffer circuit 1909 for the result scalar. Other suitable hardware implementations can be used as well.

The CPU 102 of the present disclosure can also employ a vector operation (referred to herein as the satisfy operation) that permits one or more SIMD instructions to be processed as part of a vectorized while loop for searches. The satisfy operation can be specified by an opcode that distinguishes such operation from other operations that belong to the instruction set architecture of the computer processor. In this case, the while loop iterates until a condition predicate is satisfied, and then returns the number of iterations executed before satisfaction. When a search condition is not satisfied by any of the elements of a vector then it is simple to add the vector length to the running count of iterations. However, if the condition is satisfied within a vector then only the scalar iterations before satisfaction should be counted, and the program uses this count to determine the number of iterations executed before satisfaction.

According to the present disclosure, the while loop can execute the search in such a way that it computes a vector of Boolean values, where each Boolean value indicates whether the search was satisfied in the corresponding iteration. Note that there may be several satisfying iterations but only the first is of interest. This Boolean satisfaction vector is then an argument to the satisfied operation, which produces two results. The first is a count of the leading unsatisfied iterations, suitable for adding to the running total of unsatisfied iterations for the search. The second is a Boolean scalar that indicates whether any of the iterations satisfied the condition; this is used to control exit from the while loop.

Variations

The meta-data associated with scalar and vector operand data elements can also be configured with a reserved value to indicate a Vacant operand, which is used to specify operand storage elements (e.g., logical address for belt operands) that have not yet received a value. The most common example of a Vacant operand is to specify one or more operand storage elements (e.g., logical address for belt operands) within a called function that are not occupied by arguments to the function. The Vacant operand can also be used to specify registers allocated for a new function frame activation that have not yet been used. This notion of a Vacant operand is distinct from a None operand. A None has a width and scalarity, and individual elements of a vector may be None operands. In essence a None operand is an operand that is present but is to be ignored. A Vacant operand is simply not there, and it is not meaningful for one element of a vector to be Vacant. Any read reference to a Vacant operand can be treated as an error and can trigger a fault on the CPU. Such a fault typically indicates a hug in the compiler or other program that generated the code making the reference.

The time between detection of a fault and its report when a NAR is processed by a non-speculable operation can be quite lengthy, especially if the NAR is live across intervening calls. This may make it difficult for the programmer to determine the point of detection and thence the cause of the problem. To make the location activity easier, the CPU 102 of the present disclosure can employ a mode in which there is no speculative execution at all and all faults are reported immediately at point of detection of a NAR. In one embodiment, speculation can be selectively disabled by software that operates on the program code at program load time. Such software can transform the program code such that all speculation is omitted and the operations are scheduled such that all flow of control that any given operation depends on has been fully resolved before the given operation is issued for execution by the CPU. This transformation ensures that any detected fault is necessarily genuine.

In support of this mode, the CPU can be configured to immediately report any NAR produced by an operation as a fault without waiting for the NAR to be processed by a non-speculable operation. This specific mode may be an attribute of a process, a thread, or a function invocation, but would normally be active whenever the CPU is executing code that has been compiled without speculation. Furthermore, this specific mode may be static (i.e., set when a program marked as no-speculation is loaded) or may be dynamically entered and exited by an operation, as for example by a debugger.

It is also contemplated that certain programming tools may need to be able to inspect operands that might be NARs and examine or change the payload or NAR status. Chief among these tools are debuggers, which must be able to show the user the fact of occurrence or value of a NAR without triggering a NAR fault within itself. The CPU may use specific operations (referred to as a splitNAR operation and joinNAR operation) to deal with this case. The splitNAR and joinNAR operations can be specified by different opcodes that distinguish such operations from one another and from other operations that belong to the instruction set architecture of the computer processor. Specifically, the splitNAR operation accepts an operand as argument, and produces two operands as its result. One result contains the NAR bit(s) of the argument as payload data; the other result contains the original payload of the argument, with its NAR bit(s) cleared. If neither result is a NAR, it can safely be stored to memory by a normal store operation. The joinNaR operation reassembles the original operand from the previously split parts.

This pair of operations turns a single operand into two, which will then require two loads and two stores to run-out to memory and back. This is the best that can be done if the original operand was a vector or vector-sized scalar, but is unnecessarily costly otherwise. Consequently, the CPU may use additional operations (referred to as the jamNAR operation and the unjamNAR operation) to address this issue. The jamNAR operation splits the NAR bit(s) from its argument operand in the same way as splitNAR operation, but instead of returning them with the payload as two results it concatenates them in the high bits of a single double-width result, with the original payload in the low bits. This requires only a single store and load to run-out to memory, a significant saving over use of the splitNAR operation. The unjamNAR operation naturally reverses this process, accepting a double-width operand with NAR bits and payload in high and low parts and returning a single-width operand with the actual NAR bits (if any) set appropriately. The jamNAR and unjamNAR operations can be specified by different opcodes that distinguish such operations from one another and from other operations that belong to the instruction set architecture of the computer processor.

These operations can save (and restore) the NAR bit(s) of the operand because the values of the NAR bit(s) is known only at run time. The operations can be configured to not save (and restore) the width element of the meta-data of the operand because the width for any operand is known at compile time, and can be re-asserted when the value is restored.

It can happen that there are more transient operands than fit in the fast operand storage elements of the CPU (such as the registers or belt). In this case, such transient operands can be explicitly stored to memory by code in the program, and subsequently filled back from memory when (and if) they are needed again by the executing program. However, the operands are still speculative at storage time, and may contain NARs that subsequent control flow will determine to have been from off the taken path. A simple store of the operand would then deliver an incorrect fault.

It is possible to split an operand by executing a splitNAR operation and then store the two results using a normal store operation. However, the splitNAR operation adds its results to fast operand storage which can further degrade performance when there are more transient operands than fit in the fast operand storage elements of the CPU. To address this issue, the CPU can employ spill and fill operations that combine the effect of splitNAR and store (for spill operations) to a scratchpad and load and joinNAR (for fall operations) from the scratchpad. In the spill operation, the split operand is not stored in fast operand storage elements of the CPU but instead stored in the scratchpad. In the fill operation, the split parts of the operand are not in fast operand storage elements of the CPU but instead only the reconstructed operand is stored in the fast operand storage elements of the CPU. Details of an exemplary scratchpad and associated spill and fill operations are described in U.S. patent application Ser. No. 14/311,988 filed on Jun. 23, 2014, commonly assigned to assignee of the present application and incorporated by reference above in its entirety. Note that the spill and fall operations implicitly address the current stack frame. The spill operation saves the width tags well as the NAR bits, and the fill operation restores it. Consequently, the spill operation needs only a frame offset and the address of a fast operand storage element as arguments, and fill operation needs only the offset, making them very compact.

There have been described and illustrated herein several embodiments of a computer processor and corresponding method of operations. While particular embodiments of the invention have been described, it is not intended that the invention be limited thereto, as it is intended that the invention be as broad in scope as the art will allow and that the specification be read likewise. For example, the microarchitecture and memory organization of the CPU as described herein is for illustrative purposes only. A wide variety of CPU microarchitectures can embody the improvement and methods described herein, including microarchitectures that employ in-order execution, microarchitectures that employ out-of-order execution, superscalar microarchitectures, VLIW microarchitectures, single-core microarchitectures, multi-core microarchitectures, and combinations thereof. In another example, the functionality of the CPU as described herein can be embodied as a processor core and multiple instances of the processor core can be fabricated as part of a single integrated circuit (possibly along with other structures). It will therefore be appreciated by those skilled in the art that yet other modifications could be made to the provided invention without deviating from its spirit and scope as claimed.

What is claimed is:

1. A computer processing method comprising:
providing a memory system that includes cache and main memory, and at least one processor core that is operably coupled to the memory system, wherein the at least one processor core includes at least one functional unit and a plurality of operand storage elements separate from the memory system, wherein the plurality of operand storage elements store operand data values and associated meta-data as unitary operand data elements, and wherein the at least one functional unit performs operations that access respective unitary operand data elements stored in the plurality of operand storage elements;

in response to a load operation that specifies a memory address for loading at least one operand data value, operating the at least one processor core to construct a given unitary operand data element by generating meta-data corresponding to the load operation, using the memory address to load the at least one operand data value from the memory system to the at least one processor core, and combining the meta-data generated by the at least one processor core with at least one payload item that includes the at least one particular operand data value loaded from the memory system; and in response to a store operation that specifies a memory address for storing the at least one operand data value of the given unitary operand data element, operating the at least one processor core to process the given unitary operand data element by disassociating the meta-data from the at least one payload item of the given unitary operand data element, and storing the at least one operand data value of the at least one payload item of the given unitary operand data element in the memory system;

wherein the meta-data that is part of the given unitary operand data element specifies i) an operand type that represents one of a scalar operand type and a vector operand type, and ii) a width of the at least one operand data value; and wherein the meta-data that is part of the given unitary operand data element is different from opcodes that specify the operations performed by the at least one functional unit of the at least one processor core.

2. The computer processing method according to claim 1, wherein:

the at least one functional unit accesses the respective unitary operand data elements stored in the plurality of operand storage elements by hardware operations that deal jointly with the operand data values and the associated metadata together as the unitary operand data elements.

3. The computer processing method according to claim 1, wherein:

the scalar operand type represents a single scalar operand data value, and the vector operand type represents a number of scalar operand data values.

4. The computer processing method according to claim 3, wherein:

the single scalar operand data value represented by the scalar operand type has one of a number of predefined widths in bytes.

5. The computer processing method according to claim 4, wherein:

the meta-data of the given unitary operand data element specifies the scalar operand type and further specifies one of the number of predefined widths in bytes.

6. The computer processing method according to claim 3, wherein:

the number of scalar operand data values represented by the vector operand type each have one of a number of predefined widths in bytes.

7. The computer processing method according to claim 6, wherein:

the meta-data of the given unitary operand data element specifies the vector operand type and further specifies one of the number of predefined widths in bytes.

8. The computer processing method according to claim 1, wherein:

the meta-data and at least one payload item of another unitary operand data element stored in the plurality of operand storage elements have a configuration that represents a Not-A-Result operand that is indicative of an error condition.

9. The computer processing method according to claim 8, wherein:

the at least one payload item that is part of the unitary operand data element that represents the Not-A-Result operand includes debugging information.

10. The computer processing method according to claim 9, wherein:

the debugging information includes information that reflects a nature of the error condition and/or information that provides an indication of program location for the error condition.

11. The computer processing method according to claim 8, wherein:

the at least one functional unit is configured such that, when processing a speculable operation that operates on the unitary operand data element representing the Not-A-Result operand, the unitary operand data element representing the Not-A-Result operand propagates to a result of the speculable operation.

12. The computer processing method according to claim 8, wherein:

the at least one functional unit is configured such that, when processing a non-speculable operation that operates on the unitary operand data element representing the Not-A-Result operand, the at least one functional unit generates a fault that requires special handling.

13. The computer processing method according to claim 1, wherein:

the meta-data and at least one payload data item of another unitary operand data element stored in the plurality of operand storage elements have a configuration that represents a None operand that is indicative of a missing operand value.

14. The computer processing method according to claim 13, wherein:

the at least one payload data item that is part of the unitary operand data element that represents the None operand includes debugging information.

15. The computer processing method according to claim 14, wherein:

the debugging information includes information that provides an indication of program location for the missing operand.

16. The computer processing method according to claim 13, wherein:

the at least one functional unit is configured such that, when processing a speculable operation that operates on the unitary operand data element that represents the None operand, the unitary operand data element that represents the None operand propagates to a result of the speculable operation.

17. The computer processing method according to claim 13, wherein:

the at least one functional unit is configured such that, when processing a non-speculable operation that operates on the unitary operand data element that represents the None operand, the at least one functional unit skips the non-speculable operation and does not update state information.

18. The computer processing method according to claim 1, wherein:

the meta-data of the given unitary operand data element specifies a scalar operand type that represents a floating-point number and further specifies a set of floating-point error condition flags.

19. The computer processing method according to claim 18, wherein:

the at least one functional unit is configured such that, when processing a floating-point operation on the unitary data element of the scalar operand type that represents the floating-point number, the set of floating-point error condition flags specified by the meta-data of the unitary data element are logically combined together with the set of floating-point error condition flags that result from the floating-point operation by a Boolean OR operation in order to derive the set of floating point error condition flags for a resultant scalar operand.

20. The computer processing method according to claim 18, wherein:

the at least one functional unit is configured such that, when processing a non-speculable operation on the unitary data element of the scalar operand type that represents the floating-point number, the set of floating-point error condition flags specified by the meta-data of the unitary data element are used to update a set of global floating point error registers.

21. The computer processing method according to claim 1, wherein:

the memory system is configured such that it does not include the meta-data of the given unitary operand data element.

22. The computer processing method according to claim 1, wherein:

the at least one processor core further includes data paths configured to carry the meta-data and the at least one operand data value of the given unitary operand data element.

23. The computer processing method according to claim 1, wherein:

the at least one functional unit is configured to input the meta-data and the at least one operand data value of the given unitary operand data element, process width signals from the meta-data of the given unitary operand data element, and process the at least one operand data value of designated width as dictated by the width signals.

24. The computer processing method according to claim 1, wherein:

the memory address of the load operation specifies at least one cache line of the memory system that contains the at least one particular operand data value, and the memory address of the store operation specifies at least one cache line of the memory system that will store the at least one particular operand data value of the at least one payload item of the given unitary operand data element.

25. The computer processing method according to claim 1, wherein:

the meta-data of the given unitary operand data element is generated based on encoding of the load operation.

* * * * *